US012809987B2

(12) United States Patent
Benameur

(10) Patent No.: US 12,809,987 B2
(45) **Date of Patent: *Nov. 24, 2026**

(54) ENHANCING APPLICATION SECURITY BY PERFORMING APPLICATION VULNERABILITY REDUCTION BASED ON STATIC ANALYSIS OF DYNAMICALLY LOADED SYMBOLS AND SYSTEM CALL BLOCKING

(71) Applicant: NetApp, Inc., San Jose, CA (US)

(72) Inventor: Azzedine Benameur, Fairfax, VA (US)

(73) Assignee: NetApp, Inc., San Jose, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 18/540,211

(22) Filed: Dec. 14, 2023

(65) Prior Publication Data

US 2024/0220634 A1 Jul. 4, 2024

Related U.S. Application Data

(60) Provisional application No. 63/517,693, filed on Aug. 4, 2023, provisional application No. 63/477,598, filed on Dec. 29, 2022.

(51) Int. Cl.
*G06F 21/57* (2013.01)
*G06F 8/75* (2018.01)
(Continued)

(52) U.S. Cl.
CPC .............. *G06F 21/577* (2013.01); *G06F 8/75* (2013.01); *G06F 21/51* (2013.01); *G06F 21/563* (2013.01)

(58) Field of Classification Search
CPC ...... G06F 21/577; G06F 8/75; G06F 9/44521; G06F 21/52; G06F 21/562; G06F 2221/034
See application file for complete search history.

(56) References Cited

U.S. PATENT DOCUMENTS 8,656,497 B2 * 2/2014 Amarasinghe .......... G06F 21/53 726/25
11,175,902 B2 11/2021 McLaren
(Continued)

FOREIGN PATENT DOCUMENTS

EP 3640831 B1 11/2022

OTHER PUBLICATIONS

Automated Policy Synthesis for System Call Sandboxing (Year: 2020).*
(Continued)

*Primary Examiner* — Linglan Edwards
*Assistant Examiner* — Jacob Benedict Knackstedt
(74) *Attorney, Agent, or Firm* — Jaffery Watson Hamilton & DeSanctis LLP

(57) ABSTRACT

Systems and methods for enhancing application security are provided. In one example, exposure of an application to potential security vulnerabilities is reduced by identifying dynamically loaded symbols by the application via performance of static and/or dynamic symbol analysis to identify dynamically loaded symbols that are potentially and/or actually used, respectively, and that correspond to functions contained within shared libraries. Based on a shared library's usage of functions within a standard library and a known mapping between functions of the standard library and system calls, those system calls potentially and actually accessed by the application may be identified and a security policy may be generated and configured for enforcement by a kernel security module to limit system call usage accordingly. Additionally, removal of files or functions of libraries that are deemed unnecessary for proper execution of the applications may be performed to reduce the footprint of the application.

22 Claims, 11 Drawing Sheets

(51) Int. Cl.
*G06F 21/51* (2013.01)
*G06F 21/56* (2013.01)

(56) References Cited

U.S. PATENT DOCUMENTS

| | | | |
|---|---|---|---|
| 11,748,473 B2 | 9/2023 | Araujo et al. | |
| 2020/0125731 A1 | 4/2020 | Benameur et al. | |
| 2020/0285733 A1* | 9/2020 | Kim | G06F 21/53 |
| 2020/0293354 A1* | 9/2020 | Song | G06F 8/71 |
| 2021/0026947 A1 | 1/2021 | Korotaev | |
| 2024/0004993 A1 | 1/2024 | Rozenberg et al. | |
| 2024/0220616 A1 | 7/2024 | Benameur | |
| 2024/0220632 A1 | 7/2024 | Benameur | |
| 2024/0220633 A1 | 7/2024 | Benameur | |

OTHER PUBLICATIONS

Automating Seccomp Filter Generation for Linux Applications (Year: 2021).*

AppArmor., "Linux Kernel Security Module," AppArmor, 2023, pp. 1-4 pages. URL: https://apparmor.net/.

Beattie S., "Getting Started," AppArmor, 2023, 1 page. URL: https://gitlab.com/apparmor/apparmor/-/wikis/GettingStarted.

Benameur A., et al., "Container Attack Surface Reduction Beyond Name Space Isolation," Accenture Labs, Security R&D, 2018, pp. 1-40.

Johansen J., "Documentation: AppArmor Documentation," GitLab, 2023, 3 pages. URL: https://gitlab.com/apparmor/apparmor/-/wikis/Documentation.

Linux Tutorials., "SELinux Explained with Examples in Easy Language," Computer Networking Notes, 2023, pp. 1-12. URL: https://www.computernetworkingnotes.com/linux-tutorials/selinux-explained-with-examples-in-easy-language.html.

Wiki., "Elf—OSDev Wiki," Unix System Laboratories, 2023, 9 pages. URL: https://wiki.osdev.org/ELF.

Canella C., et al., "Automating Seccomp Filter Generation for Linux Applications," Proceedings of the 14th Acm Workshop on Artificial Intelligence and Security, Acmpub27, Nov. 15, 2021, 13 pages.

Hasan M.M., et al., "Decap: Deprivileging Programs by Reducing Their Capabilities," Proceedings of the 1st Acm Sigspatial International Workshop on Geospatial Knowledge Graphs, Acmpub2 7, New York, Ny, Usa, Oct. 26, 2022 (Oct. 26, 2022), 14 Pages.

International Search Report and Written Opinion for Application No. PCT/US2023/086071, mailed on Apr. 15, 2024, 17 pages.

Liguni T., et al., "Sprofiler: Automatic Generating System of Container-Native System Call Filtering Rules for Attack Surface Reduction," 2021 International Conference on Computational Science and Computational Intelligence (CSCI), 2021, pp. 704-709.

Pailoor S., et al., "Automated Policy Synthesis for System Call Sandboxing," Proceedings of the ACM on Programming Languages 4(OOPSLA), 2020, pp. 1-26.

Wan Z., et al., "Practical and Effective Sandboxing for Linux Containers," Empirical Software Engineering, 2019, 38 pages.

Zhang H., et al., "One Size Does not Fit All: Security Hardening of MIPS Embedded Systems via Static Binary Debloating for Shared Libraries," The Sixth International Conference on Information Management and Technology, Acmpub27, 2022, pp. 255-270.

Non-Final Office Action mailed on Aug. 19, 2025 for U.S. Appl. No. 18/540,165, filed Dec. 14, 2023, 11 pages.

Non-Final Office Action mailed on Jul. 15, 2025 for U.S. Appl. No. 18/540,192, filed Dec. 14, 2024, 13 pages.

Non-Final Office Action mailed Sep. 5, 2025 for U.S. Appl. No. 18/540,178, filed Dec. 14, 2023, 17 pages.

* cited by examiner

100

200

ENHANCING APPLICATION SECURITY BY PERFORMING APPLICATION VULNERABILITY REDUCTION BASED ON STATIC ANALYSIS OF DYNAMICALLY LOADED SYMBOLS AND SYSTEM CALL BLOCKING

CROSS-REFERENCE TO RELATED APPLICATIONS

This application claims the benefit of priority of U.S. Provisional Application No. 63/477,598, filed Dec. 29, 2022 and U.S. Provisional Application No. 63/517,693, filed Aug. 4, 2023, the contents of both of which are hereby incorporated by reference in their entirety for all purposes.

BACKGROUND

Field

Various embodiments of the present disclosure generally relate to cloud and computer security. In particular, some embodiments relate to an approach for application or container vulnerability reduction by performing static analysis of executable code representing an application and/or dynamic analysis of the application during runtime, for example, to identify dynamically loaded symbols indicative of potential usage of functions of shared libraries or actual library function calls made during runtime, respectively, by the application and causing an operating system (OS) kernel security module to enforce a security or syscall policy to block system calls deemed unnecessary for the proper functioning of the application.

Description of the Related Art

The cloud has ushered in a different way of developing and deploying software, and has also introduced a fundamentally different security reality, presenting new challenges to teams responsible for keeping environments secure. Designed to be dynamic, cloud environments can be in a near-constant state of change, with infrastructure resources spun up and down multiple times a day to support cloud applications. With each event, the building blocks of cloud infrastructure need to remain secure, but doing so is a big challenge for many organizations.

Applications have evolved from the monolithic approach to the microservices architectural pattern, in which containers provide virtual environments that group and isolate processes and resources from a host and other containers. For example, a first application that executes in a first container hosted by an OS may be isolated from a second application that executes in a second container hosted by the OS. A container may be distinguished from a virtual machine in that containers may share the same kernel of an OS that hosts the containers. For example, a first container and second container may both share read only access to some resources provided by the kernel. Accordingly, containers may be more lightweight than virtual machines.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

SUMMARY

Figure 1:
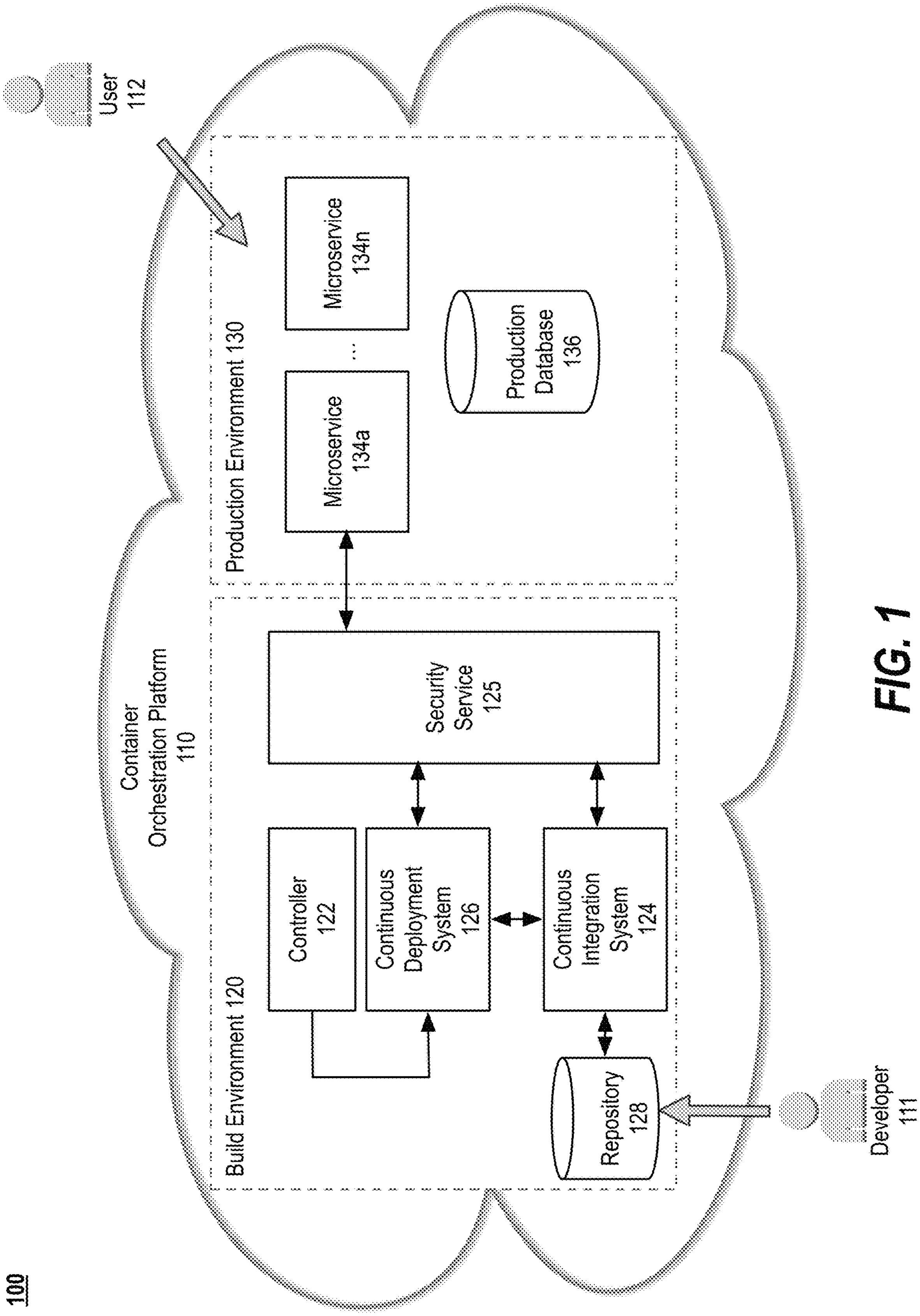
FIG. 1 is a block diagram conceptually illustrating an environment in which various embodiments may be used.

Systems and methods are described for enhancing application or container security by reducing the attack surface. According to one embodiment, an executable of an application and dependencies of the application, including one or more libraries, are received. Prior to execution of the application, a first set of kernel system calls that might be used by the application are identified by performing a static analysis of an executable representing the application. Then, a security policy is created or updated based on the first set of kernel system calls. Finally, a kernel security module is caused to block those kernel system calls that are not in the first set of kernel system calls during execution of the application by configuring the kernel security module based on the security policy.

Other features of embodiments of the present disclosure will be apparent from accompanying drawings and detailed description that follows.

DETAILED DESCRIPTION

Systems and methods are described for enhancing application or container security by reducing the attack surface.

Containerization generally refers to a software deployment process that bundles an application's executable with all the files, libraries, system tools, and the like it needs (referred to herein as "dependencies") to run on any infrastructure into a container image. In this manner, the resulting container image includes all dependencies necessary to launch a fully operational container environment in which the application runs.

Empirical data suggests up to 80% of security vulnerabilities reside outside of applications, for example, within their respective dependencies. Containerization platforms (e.g., Docker) may allow developers to define the dependencies required to create an image. Such developer-defined dependencies may be over inclusive as the dependences are generally defined at the level of granularity of a library, thereby creating greater exposure to security vulnerabilities than necessary. For example, assume an application associated with a container image relies on a first set of one or more files of a particular library to perform a specific function provided by the particular library and does not rely on a second set of one or more files of the particular library to perform the specific function. In some implementations, during execution of the application, once the application calls the specific function, all of the files of the library are accessed and loaded into memory even if the function does not use all the files in the library. In such an implementation, the application is exposed to security vulnerabilities that may be included within the second set of one or more files despite the fact that such files are not necessary for proper execution of the application. Similar exposure to security vulnerabilities may arise when developer-defined dependencies include a library not in fact necessary for proper execution of the application. While it might be tempting to simply remove from a container those library files associated with library functions not accessed during dynamic analysis of a given application, to the extent the dynamic analysis does not exercise all possible code paths, this approach may remove of a library file that is actually needed for a particular use case and result in the application failing to operate properly. As such a more thoughtful approach is warranted to avoid application breakage.

Embodiments described herein seek to reduce the exposure of applications (e.g., containerized applications or monolithic applications) to potential security vulnerabilities by performing one or both of static (executable file) and dynamic (run-time) analysis of dynamically loaded symbols by an application. Static symbol analysis may include examining one or more sections of an executable to identify dynamically loaded symbols corresponding to functions contained within shared libraries (e.g., shared object files and dynamic libraries). For example, using a standard Linux executable file format as a non-limiting example of an executable file, as described further below, the symbol table (.symtab) section and/or the dynamic linking symbol table (.dynsym) section of the executable or other sections of the type SHT_SYMTAB and/or SHT_DYNSYM may be parsed and analyzed. Based on a given shared library's usage of functions within standard libraries (e.g., the standard C library) and a known mapping between functions of standard libraries and kernel system calls, those kernel system calls potentially accessed by the application may be identified and a security policy may be generated and configured for enforcement by a kernel security module to limit kernel system call usage accordingly.

Because static symbol analysis may be overly inclusive, in some embodiments, the security policy may be refined based on a dynamic (run-time) analysis of the application either pre-deployment or post-deployment.

Some embodiments may further combine the static and/or dynamic analysis discussed above with removal of files or functions of libraries and/or entire libraries that are deemed unnecessary for proper execution of their respective applications. Such embodiments provide the additional benefit of reducing the footprint of an application or a container image (e.g., an executable of an application within the container image). Such a reduction of the footprint might be particularly advantageous in the context of a mobile application or an embedded application. In one embodiment, the actual dependencies necessary for proper execution of an application may be determined at least in part by performing dynamic analysis (e.g., monitoring the behavior of the application with an application or container monitor to log information regarding functions and/or files of a library that are actually called and accessed, respectively). In addition, because the behavior observed during dynamic analysis may not be representative of all potential code paths, for example, when the observed behavior results from functional testing, unit testing or a limited execution timeframe, static analysis of an executable representing the application may also be performed to identify other library function calls that may exist in code paths not exercised during dynamic analysis. By combining both dynamic and static analysis to determine those files and/or libraries deemed to be necessary for the proper execution of an application, security vulnerability exposure may be reduced without the potential side effect of breaking the application due to removal of an actual application dependency that is not easily identified by the performance of limited dynamic analysis alone.

Various embodiments of the present technology provide for a wide range of technical effects, advantages, and/or improvements to computing systems and components. For example, various embodiments may include one or more of the following technical effects, advantages, and/or improvements: 1) use of non-routine and unconventional operations to reduce exposure of applications to security vulnerabilities; 2) use of dynamic symbol analysis of an executable of an application to create a security policy for run-time enforcement by a kernel security module; 3) use of dynamic symbol analysis to refine a security policy previously created based on static symbol analysis of an executable; and 4) use of required file scanning/monitoring alone or in combination with static and/or dynamic symbol analysis to reduce exposure of an application to security vulnerabilities as well as reduce the footprint of the executable of the application.

While in the context of various examples described herein, a binary or executable of an application may be assumed to be in a standard Linux executable file format (i.e., Executable and Linkable Format (ELF, formerly called Extensible Linking Format), it is to be appreciated the methodologies described herein are broadly applicable to other executable file formats in which container-based or standalone applications may be represented and/or distributed.

While in the context of various examples described herein, the attack surface is reduced for containers including executables, which may provide application functionality in the form of microservices running in a production cloud environment, it is to be appreciated the approach is broadly applicable to other target computing environments in which the operating system at issue includes a kernel security module that may limit or block kernel system calls based on a security policy (e.g., a syscall policy) with which it is configured. Non-limiting examples of such other target computing environments may include embedded systems (e.g., in which a program, for example, in the form of firmware is executed by an embedded system) and high assurance computing environments or systems, including, but not limited to, military systems, flight programs for both commercial and military aircraft, air traffic control systems, financial and commerce systems, and medical systems.

While in the context of various examples described herein, the attack surface is reduced for applications by causing a kernel security module to block system calls based on one or both of static and dynamic symbol analysis, it is to be appreciated in other examples in addition to or instead of blocking system calls, such calls may be logged or used to create an audit trail (e.g., capturing information regarding system call activity relating to system calls identified by the static and/or dynamic symbol analysis as not being necessary for the proper functioning of the application) for use by an administrative user, for example, to allow the administrative user to manually create or refine a security policy for enforcement by the kernel security module.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein an "operating system kernel security module," "OS kernel security module," or simply a "kernel security module" generally refers to an access control system that is built into the kernel of an operating system and used to enforce policies that define what level of access users, programs, and/or services have on a system. Non-limiting examples of an OS kernel security module include Security-Enhanced Linux (SELinux) and Application Armor (AppArmor).

As used herein a "security policy" generally refers to a policy of an OS kernel security module that defines a set of one or more rules indicative of which process can access which system resources (e.g., kernel system calls, files, directories, and/or ports). Non-limiting examples of a security policy include a SELinux policy or an AppArmor policy or profile. In various embodiments described herein a security policy may be created or updated to restrict and/or allow access to various OS kernel system calls. For example, allow or deny rules may be added to a security policy associated with a process to enable access to a specified kernel system call or disable access to a specified kernel system call, respectively. In some embodiments, a security policy may be created or updated based on an evaluation regarding which OS kernel system calls are potentially used or actually used, by performing one or both of static analysis of an executable of an application (prior to run-time) and dynamic analysis of the application during run-time either pre- or post-deployment within a production environment.

As used herein a "syscall policy" generally refers to a security policy relating to kernel system calls.

As used herein a "cloud," "cloud system," "cloud platform," and/or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

DevOps (a combination of software development (Dev) and information-technology (IT) operations (Ops)), microservices, and containerization and have changed the way applications are represented, developed, tested and deployed. DevOps is a set of practices that automates the processes between software development and IT teams that seeks to facilitate building, testing, and releasing of software faster and more reliably. DevOps involves continuous planning, continuous testing, continuous integration, and other forms of continuous evolution of both the project and the software.

Microservice architecture takes advantage of the fact that applications are simpler to build and maintain when broken down into smaller pieces that work seamlessly together. As such, in contrast to the more traditional monolithic application architectures, the microservice architecture is an architectural style that structures an application as a collection of smaller, more specialized parts called services (or microservices), each of which communicate with one another across common interfaces (e.g., application programming interfaces (APIs) and representational state transfer (REST) interfaces, like Hypertext Transfer protocol (HTTP). Microservices are increasingly being used in the development world as developers work to create larger, more complex applications that are better developed and managed as a combination of smaller services that work cohesively together for more extensive, application-wide functionality.

The container eco-system is emerging as a prominent computing virtualization platform due in part to its native tenets of simplified manageability, scalability, and its natural fit with microservices and DevOps. A container is a standard unit of software that packages up an executable of an application and its dependencies (e.g., libraries) so the application runs quickly and reliably from one computing environment, for example, which may be supplied by a container orchestration platform (e.g., the Amazon Elastic Kubernetes Service (EKS), the Google Kubernetes Engine (GKE), or the Azure Kubernetes Service (AKS)), to another. Containers offer a logical packaging mechanism in which applications can be abstracted from the environment in which they actually run. Instead of virtualizing the hardware stack as with the virtual machines approach, containers virtualize at the operating system level, with multiple containers running atop the OS kernel of a host system directly.

As used herein, a "library" generally refers to a collection of prewritten code or pre-complied pieces of code (e.g., functions), for example, stored in object format that may be used by an application. Libraries may be static ("static libraries") in which the code of the library functions is copied into an executable file or dynamic ("dynamic libraries" or "shared libraries") that are linked with an executable file at runtime. Libraries generally offer a collection of ready-to-use features so that programmers need not re-create such features. A library may include configuration data, documentation, help data, message templates, subroutines, classes, values or type specifications. The value of a library lies in the reuse of standardized program elements. When an application invokes a library, it gains the behavior implemented inside that library without having to implement that behavior itself. As such, libraries encourage the sharing and/or reuse of features in a modular fashion and ease the development of applications. Dynamic libraries (e.g., dynamically linked libraries (DLLs)) may be distributed in binary form with the major components (e.g., kernel, window system, etc.) of an operating system. Dynamic libraries help operating systems and programs run faster and use memory more efficiently as they are loaded at runtime and are not included in the executable. This reduces the size of the executable files. As discussed further below libraries may include a collection of one or more files that provide various functions. Non-limiting examples of the type of functionality that may be provided by a library include user interface functions, encryption/decryption functions, user authentication, server connection, data management, algorithms, animations, etc.

As used herein, an "application" generally refers to a computer software package or service, regardless of the architecture type (e.g., monolithic, microservices-based, etc.) or execution environment (on-prem, cloud, embedded, high-assurance, etc.) that performs a specific function for or on behalf of an end user or, in some cases, for or on behalf of another application. An application generally refers to the main software that contains the executable (i.e., the binary or executable file that a compiler creates based on the source code files) and all necessary dependencies (e.g., files, DLLs, configuration files, and other ancillary files needed for the software to execute correctly).

As used herein, an "executable file," or simply an "executable" generally refers to a file that contains encoded instructions (e.g., machine code) and that is capable of being run or executed as a program or an application on one or more virtual or physical processing resources (e.g., central processing units (CPUs) or virtual CPUs). An executable is typically created by a compiler based on one or more source code files. Executables may also be referred to as binaries as they are typically stored in binary format. Non-limiting examples of executable files include EXE files (e.g., .exe files), which are most commonly used on Window computers to install or run software applications, and ELF files (e.g., .elf files), which are the standard executable file format for Linux and Unix-like operating systems, including Linux, Berkely Software Distribution (BSD), Solaris/Illumos, Free-, Net- and OpenBSD, QNX, BeOS/Haiku, and Fuchsia OS.

As used herein, "static executable analysis" or simply "static analysis" generally refers to analysis of an executable of an application. Static analysis may be used to determine what library files and/or function calls are potentially required (represent true dependencies of the application without which the OS or the application will emit error messages or the application will fail to function) and that should be maintained for proper functioning of the application (which may be referred to herein as "required file scanning"). Static analysis may involve parsing and analyzing various sections of an executable (e.g., ELF) to identify calls that might potentially be made by the application during runtime to one or more libraries and/or one or more functions of the one or more libraries (which may be referred to herein as "static symbol analysis"). As noted above, static analysis is generally overly inclusive as some paths of an application may not ultimately be reachable during execution of the application. As such, static analysis may be used as part of a conservative approach for performing file, library, and/or function removal to create an executable for the application having less exposure to unnecessary files, libraries, and/or functions as well as a smaller footprint (an executable of smaller size). In some examples described herein, required file scanning may be combined with dynamic and/or static symbol analysis to achieve a smaller size executable (without potential breakage of the application) as well as enhanced vulnerability reduction (beyond the base-level protection from the potential vulnerabilities in the one or more removed files, libraries, and/or functions) by additionally causing an OS kernel security module to block system calls deemed unnecessary for the proper functioning of the application. For example, dynamic symbol analysis may identify those system calls not utilized, for example, during pre-deployment testing, during performance of a given workload in the production environment, and/or otherwise during a predetermined or configurable monitoring window as the application is executed in a build environment or a production environment, thereby allowing a security (or syscall policy) to be enforced during runtime that blocks system calls to which no library function calls made during the predetermined or configurable monitoring window map.

As used herein, "dynamic executable analysis" or simply "dynamic analysis" generally refers to analysis or monitoring of an executable of an application during runtime within a given computing environment. Dynamic executable analysis may involve monitoring of one or more files accessed, one or more libraries utilized or otherwise loaded into memory (which may be referred to herein as "required file monitoring"), and/or one or more library function calls made by the application during runtime (which may be referred to herein as "dynamic symbol analysis"). Depending on the particular embodiment, dynamic analysis may be performed during pre-deployment testing of the application, during performance of a given workload in a production environment, and/or otherwise during a predetermined or configurable monitoring window as the application is executed in a testing or build environment or target computing environment (e.g., a production environment)

As used herein, "required file monitoring" generally relates to a subset of dynamic analysis specifically relating to dynamic monitoring of files accessed by the application.

Required file monitoring may be performed pre- or post-deployment of the application to determine which dynamic (or shared) libraries are actually loaded during a predetermined or configurable monitoring window of an application as it is being executed within a given computing environment.

Example Operational Environment

FIG. 1 is a block diagram conceptually illustrating an operational environment 100 in which various embodiments may be used. The operational environment 100 may include a container orchestration platform 110 (e.g., Amazon EKS, GKE, or AKS). In the context of the present example, the container orchestration platform 110 includes a build environment 120 and a production environment 130. A build environment is an environment with which software developers (e.g., developer 111) interact and typically includes tools or resources to augment and/or automate activities associated with the software development cycle, whereas a production environment (or a deployment environment) is the environment with which end users (e.g., user 112) and/or other clients of a service or an application interact.

In the context of the present example, the build environment 120 includes a controller 122, a continuous deployment (CD) system 126, a continuous integration (CI) system 124, a security service 125, and a repository 128. According to one embodiment, the controller 122 may be a service deployed by the container orchestration platform 110 that is responsible for controlling and automating various tasks within the build environment 120 and the production environment 130. A source code control system (not shown) may maintain and track various versions of source code for an application in the repository 128. The CI system 124 may be responsible for, among other things, triggering pre-deployment testing of application code stored within repository. As described further below, such pre-deployment testing may include vulnerability scanning, dynamic (run-time) analysis, and static executable analysis. The dynamic analysis may include performance of automated functional testing of container images. The static analysis may include scanning of an executable representing an application for calls to library functions. As described further below, based on the results of the dynamic analysis and static analysis, a new container image may be generated for an existing container image that excludes certain files (e.g., files associated with one or more operating system (OS) libraries or library functions) deemed unnecessary for proper functioning of the application. This process may be referred to as container vulnerability reduction as the application is no longer exposed to any security vulnerabilities associated with those files, libraries, and/or functions excluded from the new container image. The CI system 124 may also be responsible for merging or integrating successfully tested updates to microservices of an application into a current production version of the application. The CD system 126 may be responsible for automatically deploying application builds identified by the CI system 124 to the production environment 130. In one embodiment, the CI system 126 may make use of a security service 125 to perform one or more aspects of the pre-deployment testing and the CD system 126 may make use of the security service 125 to perform container vulnerability reduction.

Some forms of dynamic analysis, such as unit, functional, integration, contract tests, and others, may be used to exercise microservice code paths using synthetic (i.e., not real production) input prior to deployment of a microservice under test to the production environment 130. Given the desire for prompt software releases and faster delivery of updates, the nature and duration of dynamic analysis is necessarily limited in such an environment and is likely not to exercise all possible code paths of the application. As such, as described further below, in some embodiments, such dynamic analysis may be supplemented with static analysis of an executable of the application associated with a given container to ensure all potential dependencies of the application are retained within the newly generated container instance when performing container vulnerability reduction. Depending on the particular embodiment, dynamic analysis and/or static analysis may alternatively or additionally be performed post-deployment in the production environment 130.

In the context of the present example the production environment 130 includes various resources in the form of multiple microservices (e.g., microservices 134*a-n*) and a production database 136 that collectively represent an application that may be used by the user 112.

While in the context of the present example, it is assumed a particular development team (e.g., including developer 111) produces and updates source code for an application that is persisted to a repository (e.g., repository 128) and container images resulting from a build process based on the source code are deployed within a production environment (e.g., protection environment 130) to allow the application to be accessed by users (e.g., user 112), it is to be appreciated the application vulnerability reduction methodologies described herein are equally applicable to third-party software applications developed by software developers unaffiliated with the operating environment (e.g., container orchestration platform 110) or the computing environment (e.g., production environment 130) in which the application is to be run. Furthermore, while in the context of the present example, it is assumed an application is deployed as a service in the form of multiple microservices (e.g., microservices 134*a-n*) within a particular computing environment (e.g., production environment 130) provided by a public cloud provider, it is to be appreciated the methodologies described herein are equally applicable to applications targeted for various other types of computing environments, including, but not limited to, for example, on-premises data centers, individual client workstations or servers (e.g., Linux or Windows computers), embedded systems, industrial control systems, and the like.

Example Executable File

Figure 2:
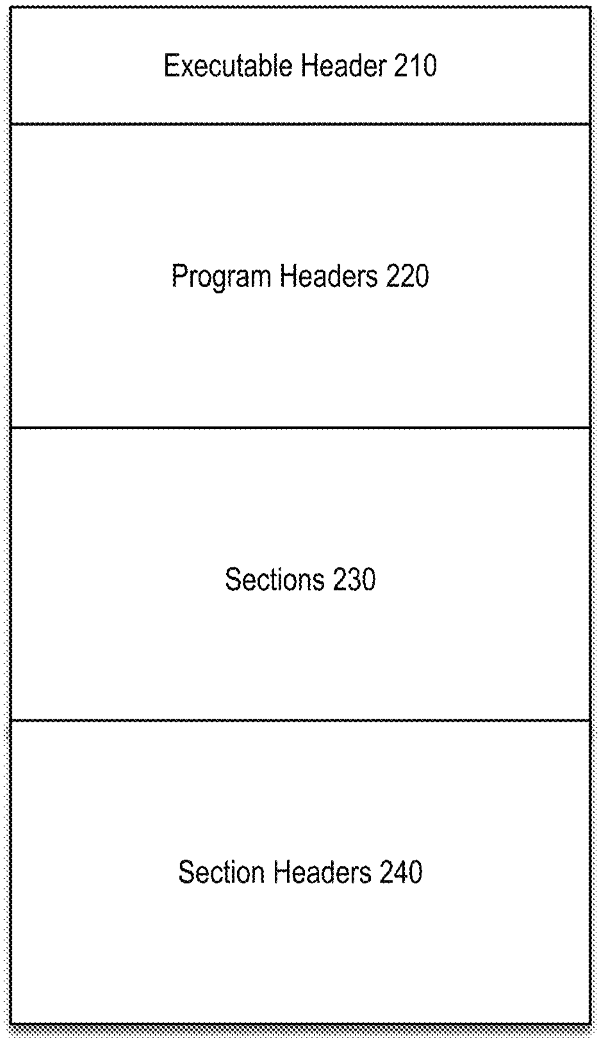
FIG. 2 is a block diagram conceptually illustrating a format of an executable of an application.

FIG. 2 is a block diagram conceptually illustrating a format of an executable 200 of an application. In the context of the present example, the executable 200 is assumed to be in the form of a standard executable file format (i.e., ELF) for Linux and Unix-like operating systems, and is shown having an executable header 210, program headers 220, sections 230, and section headers 240. The executable header 210 (e.g., an ELF header) may reside at the beginning of the executable 200 and contains a road map describing the file's organization. The program headers 220 generally tell the system how to create a process image. A data structure, a program header table, within the program headers facilitates location of segment images within the file and contains other information to create the memory image for the program.

The sections 230 may include various sections that hold program and control information. For sake of brevity, only the symbol table (.symtab) section and the dynamic linking symbol table (.dynsym) section are described herein. The symbol table section holds a symbol table, which includes a set of symbol table entries each having information, such as a name, a value, and a size or references or indices into other tables where such information may be found. Non-limiting examples of dynamically loaded symbols are those symbols of a particular type (e.g., STT_FUNC) that are associated with a function or other executable code in shared libraries. Typically, the symbol table section provides symbols for link editing; however, it may also be used for dynamic linking. As a complete symbol table, it may contain many symbols that are unnecessary for dynamic linking. Consequently, the executable 200 may also include a dynamic linking symbol table section, which holds a minimal set of dynamic linking symbols. According to one embodiment, a static analysis may be performed on one or both of the symbol table section and the dynamic linking symbol table section to identify dynamically loaded symbols that may be used by the application.

The section headers 240 may include a section header table containing information describing the sections 230 within the executable 200. Each section has an entry in the section header table; each entry gives information such as the section name, the section size, etc.

Further information regarding the ELF format can be found in https://www.cs.cmu.edu/afs/cs/academic/class/15213-f00/ docs/elf.pdf.

While an ELF executable is used as an example to illustrate how dynamically loaded symbols might be located within an executable file during static symbol analysis, the methodologies described herein are not limited to ELF executables and are broadly applicable to other executable file formats and container image formats.

Example Mapping of Library Function Calls

Figure 3:
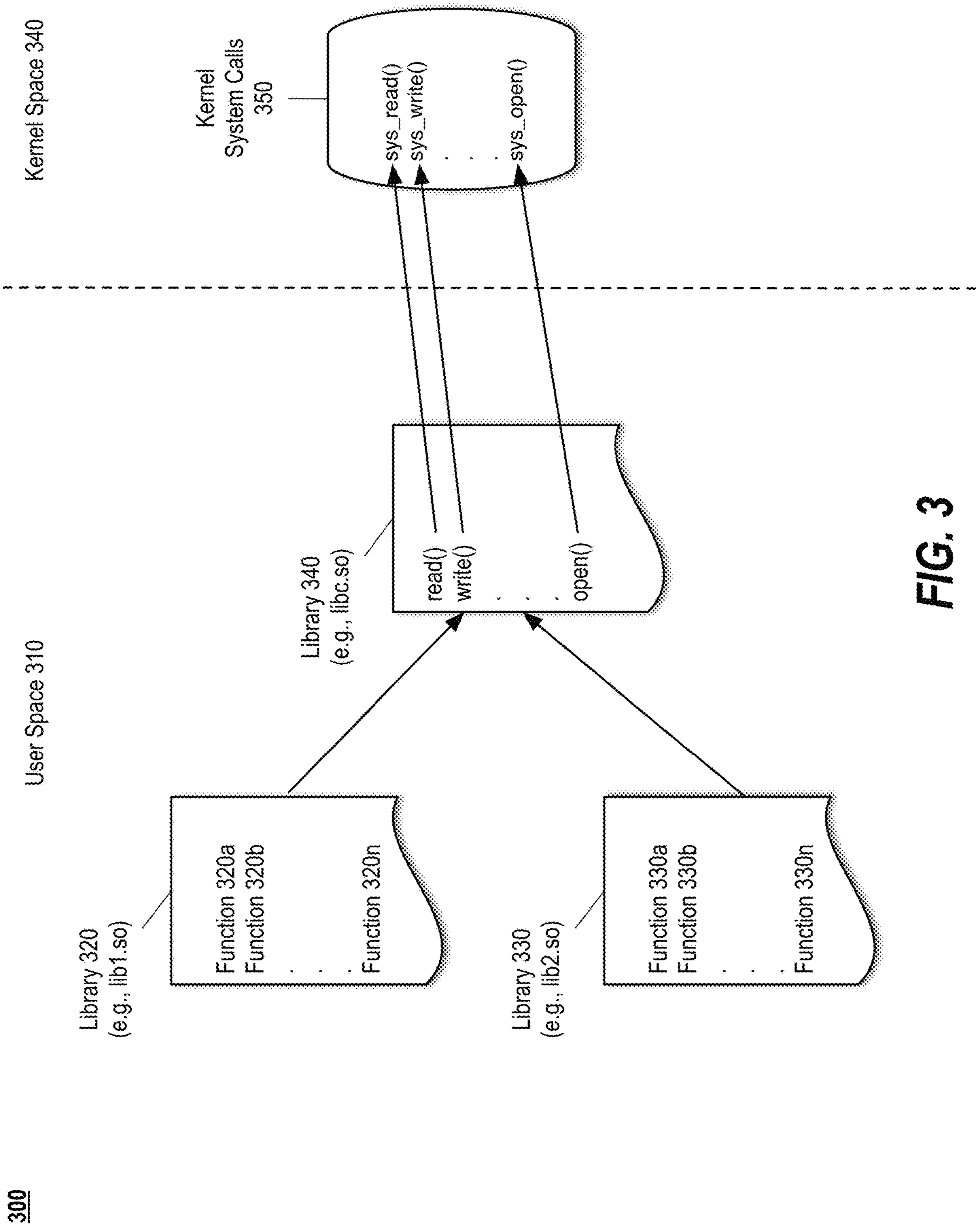
FIG. 3 is a block diagram conceptually illustrating how library function calls may be mapped to the Standard C Library and to kernel system calls according to some embodiments of the present disclosure.

FIG. 3 is a block diagram conceptually illustrating how library function calls may be mapped to the Standard C Library (e.g., library 340) and to kernel system calls 350 according to some embodiments of the present disclosure. In the context of the present example, user space 310 represents a memory areas in which application software and some drivers execute (in user mode) and kernel space 340 represents a memory area that is strictly reserved for running (in kernel mode) a privileged OS kernel, kernel extensions, and most device drivers. While processes run in kernel mode (a privileged mode of execution), they have unrestricted access to the hardware. While processes run in user mode (a non-privileged mode), they have limited access to hardware resources (e.g., central processing units (CPUs), graphics processing units (GPUs), processor cores, GPU cores, storage, and memory). As illustrated in FIG. 3, library function calls (e.g., calls to functions 320*a-n* of library 320 and calls to functions 330*a-n* of library 330, and calls to the functions exposed by library 340) are executed in user space 310 of an OS, whereas kernel system calls 350 are executed in kernel space 340 of the OS. As shown, the shared libraries 320 and 330 call user space functions (e.g., functions exposed by a standard C library, such as library 340), which ultimately call kernel system calls 350. A library call may represent a function provided by a programming library (e.g., a shared library, such as a shared object file, typically having a .so extension or a dynamic library, typically having a .dynlib extension). A system call or syscall generally represents a kernel function that is performed in kernel mode and that may access one or more hardware resources.

As noted above, in the context of containerization, dependencies (e.g., shared object files and dynamic libraries) upon which a given application relies for proper execution are bundled with the application as part of a container image. Such bundling may create a greater exposure to security vulnerabilities than necessary due to developer-defined dependencies being at a course level of granularity (e.g., the level of granularity of a library). For example, as noted above, a first function of a particular library that is utilized by an application may have no security vulnerabilities, whereas a second function of the particular library that is not utilized by the application may have a security vulnerability. In an implementation in which a call to the first function of the particular library loads all other functions of the particular library into memory, the application may now be exposed to the security vulnerability contained in the second function.

As described further below with reference to FIG. 4, in one embodiment, a security service (e.g., security service 125) may determine via static analysis of the application what libraries and/or library functions may be accessed by the application by identifying corresponding dynamically loaded symbols within particular sections (e.g., symbol table section and/or the dynamic linking symbol table) of the executable. Static analysis of the libraries (e.g., library 320, library 330, and library 340) and/or information mapping library function calls to the kernel system calls 350 may further reveal which of the kernel system calls 350 are potentially used by the application. Based on the knowledge of which of the kernel system calls 350 are potentially used by the application, the security service may configure a kernel security module (not shown) to deny execution of those of the kernel system calls 350 not used by the application so as to reduce the exposed kernel surface. In some embodiments, dynamic analysis indicative of which of the kernel system calls 350 are actually made by the application (e.g., within a predetermined or configurable execution window, such as a predetermined or configurable period of time or execution of a particular workload or particular type of workload) may be used to supplement the static analysis, for example, to reduce the scope of kernel system calls 350 allowed to be executed by the application. Such dynamic analysis may be repeated periodically or responsive to a trigger event (e.g., expiration of a timer, seasonal events based on historical data, and/or switching to a different workload or different type of workload)

Example System for Performing Container Image Vulnerability Reduction

Figure 4:
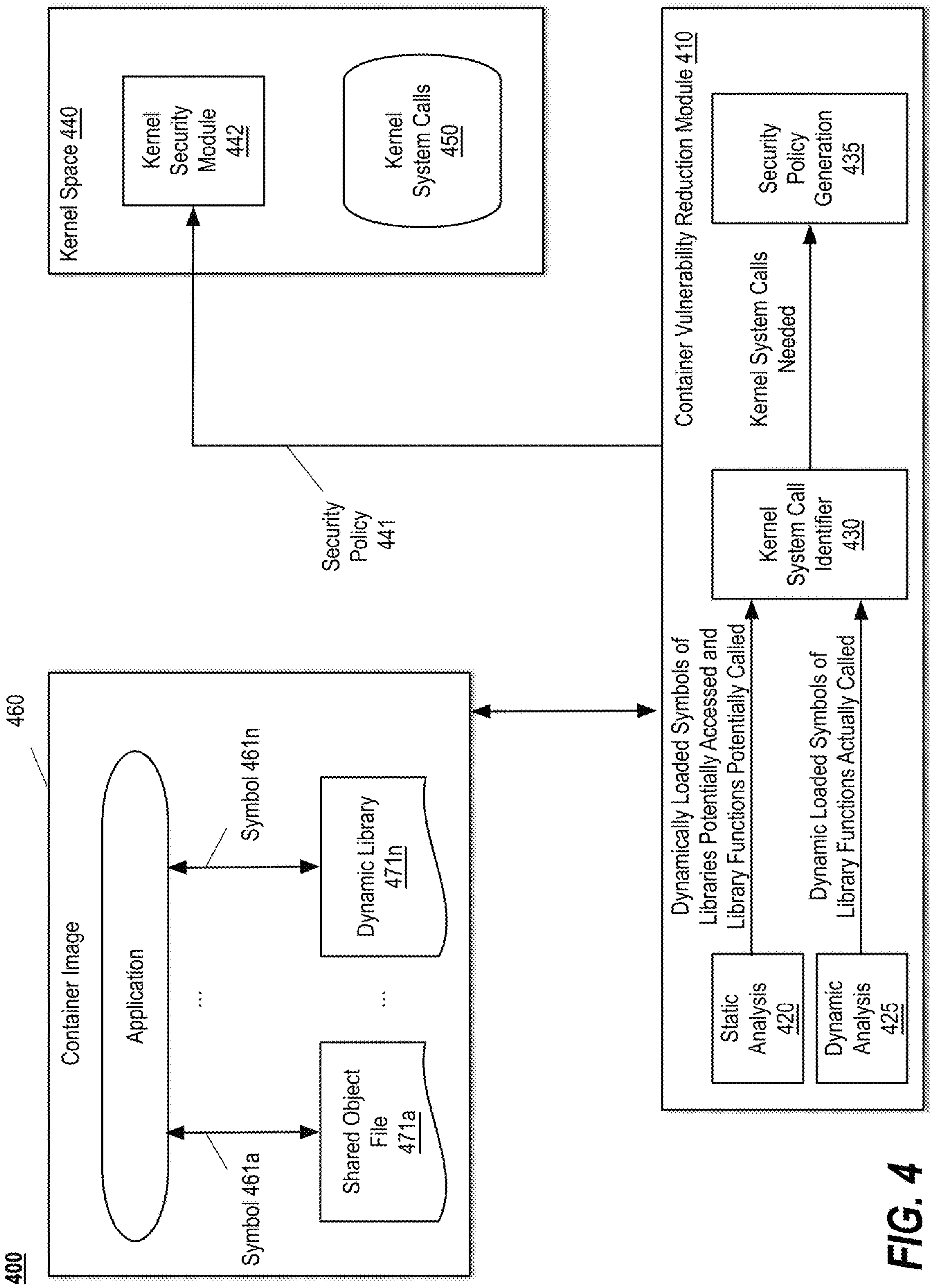
FIG. 4 is a block diagram conceptually illustrating a system for container image vulnerability reduction according to some embodiments of the present disclosure.

FIG. 4 is a block diagram conceptually illustrating a system 400 for container image vulnerability reduction according to some embodiments of the present disclosure. In the context of the present example, the system 400 includes a container vulnerability reduction module 410 that reduces vulnerabilities in container images. For example, the container vulnerability reduction module 410 may perform one or both of static and dynamic analysis on a container image 460 and based thereon generate a security policy 441 for enforcement by a kernel security module 442 (e.g., SELinux, AppArmor, or the like) operable in kernel space 440. In one embodiment, the container vulnerability reduction module 410 may be implemented by a security service (e.g., security service 125) of a container orchestration platform (e.g., container orchestration platform 110).

As shown in FIG. 4, the container vulnerability reduction module 410 may statically analyze the container image 460 (e.g., at least an executable of an application represented by the container image 460) and/or dynamically monitor the application as it is executed within a container. The container image 460 may be configured to instantiate a container in which the application can be executed. To enable execution of the application, the container image 460 may include one or more shared libraries. For example, the container image 460 may include a shared object file 471*a* and dynamic library 471*n* as well one or more other shared libraries. In programming, a library may represent an assortment of pre-complied pieces of code that can be reused in a program, thereby simplifying life for developers in that they provide reusable functions, routines, classes, data structures, and so on, which they can use in their programs.

The container vulnerability reduction module 410 may determine which of kernel system calls 450 (which may be analogous to kernel system calls 350) are unnecessary for proper functioning or execution of the application and reduce vulnerabilities to which the application is exposed by causing the kernel security module 442 to deny execution of the unnecessary kernel system calls 450 by the application.

In the context of the present example, the container vulnerability reduction module 410 is shown including a static analysis module 420, a dynamic analysis module (e.g., a container monitor), a kernel system call identifier 430, and a security policy generation module 435.

Pre-deployment or post-deployment, the static analysis module 420 may parse and analyze appropriate portions of the container image for dynamically loaded symbols (e.g., symbol 461*a* or symbol 461*n* corresponding to libraries potentially accessed and/or library functions potentially called by the application) and inform the kernel system call identifier 430 of such symbols. Similarly, the dynamic analysis module 425 may identify dynamically loaded symbols actually used at run-time or corresponding library functions actually called and inform the kernel system call identifier 430 regarding same. For example, the dynamic analysis module 425 may monitor events that occur during execution of the application in a container instantiated from the container image 460. The monitoring may be accomplished by a variety of approaches, including, but not limited to, library interposition, system call table hooking, and/or the use of a syscall wrapper. As described further below, static and dynamic analysis may be used separately or in combination. For example, dynamic analysis may be triggered (periodically or responsive to certain events) to refine an overly inclusive subset of kernel system calls permitted by a security policy 441 defined based solely on static analysis or to impose limits on a reduced size container generated based on static analysis.

For its part, the kernel system call identifier 430 may determine a subset of the kernel system calls 450 needed by the application to execute properly. For example, the kernel system call identifier 430 may make use of list of standard C library calls known to be called by a given shared library or function thereof in combination with a mapping of standard C library calls to the kernel system calls 450 to identify the subset of kernel system calls that may be or are being utilized by the application. Based on this knowledge, the other kernel system calls that are unnecessary for the proper functioning of the application may be blocked, for example, by the security policy generation module 435 generating a security policy 441 to cause the kernel security module 442 to deny those kernel system calls deemed unnecessary.

Example Application Vulnerability Reduction

Figure 5:
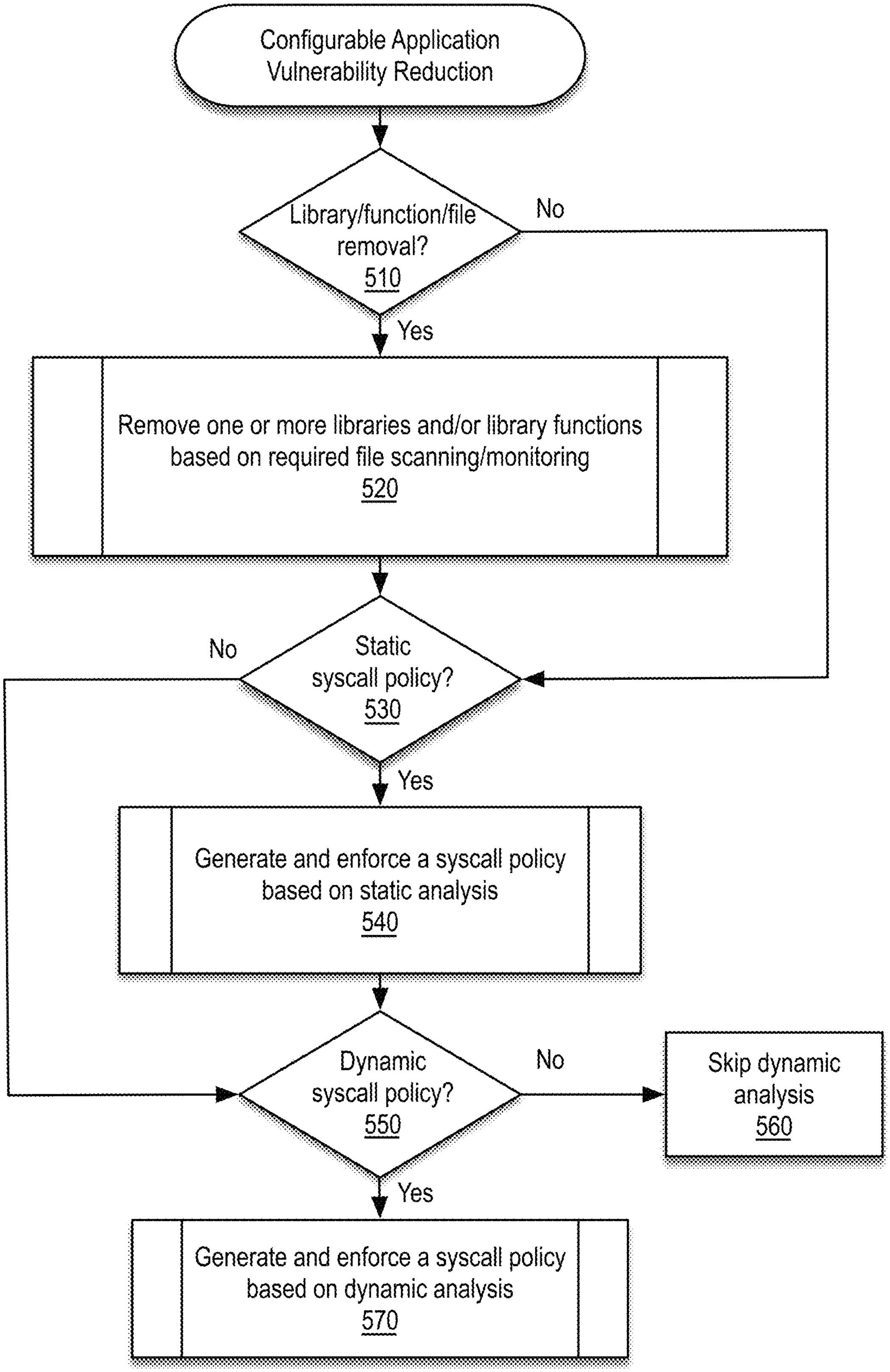
FIG. 5 is a high-level flow diagram illustrating a set of operations for performing configurable application vulnerability reduction in accordance with an embodiment of the present disclosure.

FIG. 5 is a high-level flow diagram illustrating a set of operations for performing configurable application vulnerability reduction in accordance with an embodiment of the present disclosure. Depending on the particular implementation and the target computing environment, the process described with reference to FIG. 5 may be performed by system 400 or other systems. According to one embodiment, the security service or system performing the configurable application vulnerability reduction may be part of, run on, or be one and the same as the target computing environment, for example, when the target computing environment is an on-premise data center, an individual client workstation or server. In other examples, the security service (e.g., security service 125) may be in communication with one or both of a pre-deployment environment (e.g., build environment 120) and the target computing environment (e.g., production environment 130).

At decision block 510, after an application package has been received by the system or service that is to perform the configurable application vulnerability reduction a determination is made regarding whether to perform library/function/file removal. If so, processing continues with block 520; otherwise, processing branches to decision block 530. As those skilled in the art will appreciate, the application package may be received in a variety of ways, for example, as part of an application installer (e.g., the Windows App installer), via web download (e.g., from a software repository), or on a computer-readable medium (e.g., a CD-ROM). The application package typically includes an executable of the application and all of its dependencies (e.g., the files, libraries, system tools, and/or the like it needs to run within the target computing environment). In one embodiment, various application vulnerability reduction options (e.g., whether to perform library/function/file removal, whether to perform static symbol analysis on the executable and create a static syscall policy, whether to perform dynamic symbol analysis during runtime and create a dynamic syscall policy, etc.) may be configured by an end user performing or monitoring the application installation process, for example, via a user interface presented by the application installer. Alternatively, an editable configuration file associated with the application may include defaults for the various application vulnerability reduction options and may be revised as desired by the end user.

At block 520, one or more libraries and/or library functions may be removed from the application based on required file scanning/monitoring block. For example, as described further below with reference to FIG. 10, a static analysis of the executable and/or a dynamic (runtime) analysis of the executable may be performed to identify functions and/or files that are necessary for the proper execution of an application.

At decision block 530, a determination is made regarding whether to create a security policy (e.g., a static syscall policy) based on static analysis of the executable. If so, processing continues with block 540; otherwise, processing branches to decision block 550.

At block 540, a syscall policy (e.g., security policy 441) may be generated and enforced based on static analysis. According to one embodiment, the generation and enforcement of the syscall policy may be performed in accordance with FIG. 6.

At decision block 550, a determination is made regarding whether to create a security policy (e.g., a dynamic syscall policy) or refine an existing security policy (e.g., a previously created static syscall policy) based on dynamic analysis of the executable. If so, processing continues with block 570; otherwise, processing branches to block 560.

At block 560, dynamic symbol analysis is skipped and enforcement of the syscall policy, if any, generated at block 540 may be enforced during runtime of the application, for example, by a kernel security module (e.g., kernel security module 442).

At block 540, a syscall policy (e.g., security policy 441) may be generated or dynamically refined (if one already exists) and enforced based on dynamic analysis. According to one embodiment, the generation or dynamic refinement may be performed in accordance with block 720 of FIG. 7 based on dynamic analysis of the application during runtime. As the application runs, the newly generated syscall policy or the dynamically refined syscall policy may be enforced during runtime of the application, for example, by a kernel security module (e.g., kernel security module 442).

Figure 6:
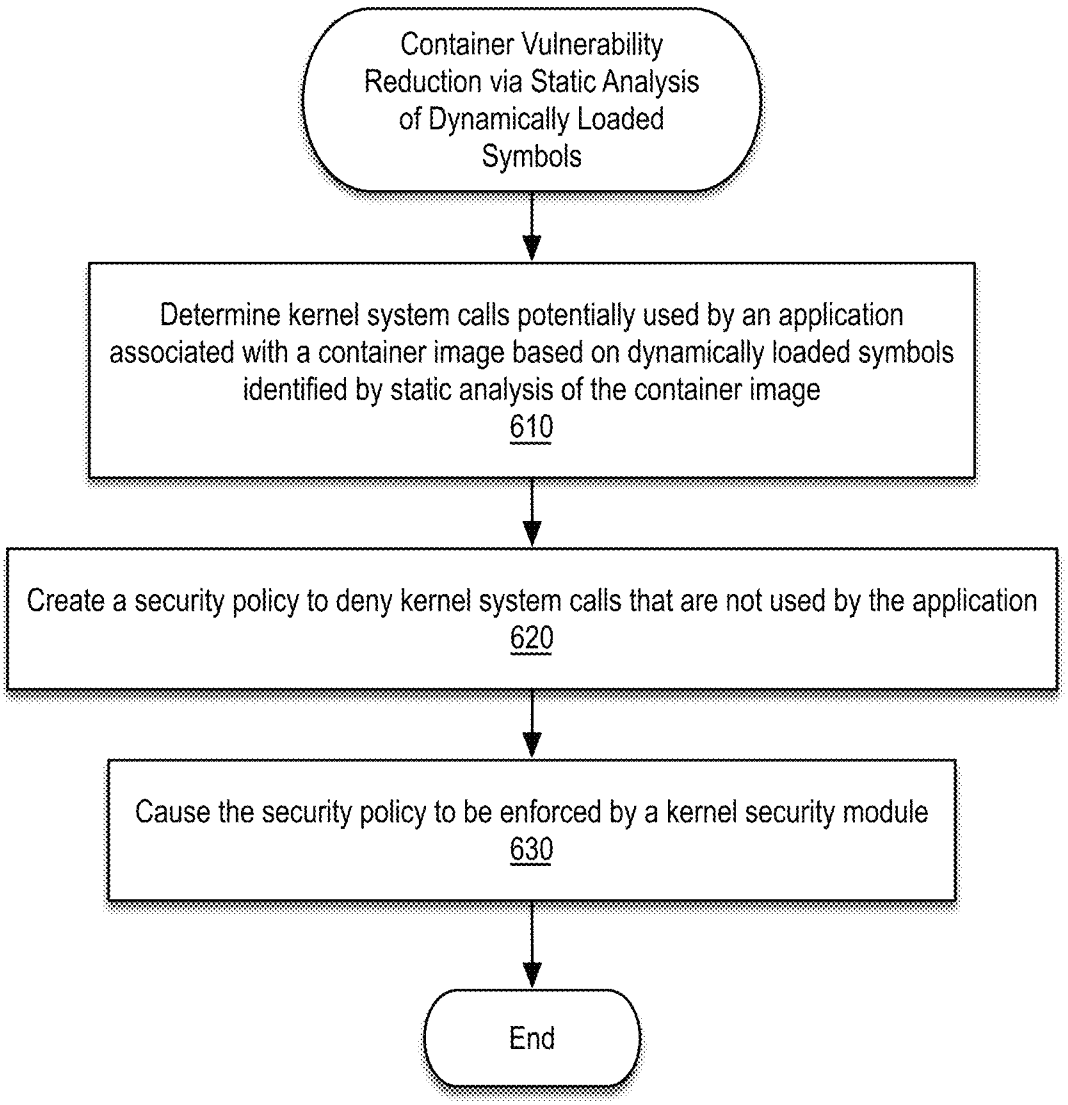
FIG. 6 is a flow diagram illustrating a set of operations for performing container vulnerability reduction via static analysis of dynamically loaded symbols in accordance with an embodiment of the present disclosure.

Example Container Image Vulnerability Reduction via Static Symbol Analysis of an Executable FIG. 6 is a flow diagram illustrating a set of operations for performing container vulnerability reduction via static analysis of dynamically loaded symbols in accordance with an embodiment of the present disclosure. Depending on the particular implementation, the process described with reference to FIG. 6 may be performed by system 400 or other systems.

At block 610, a determination is made regarding which kernel system calls (e.g., a subset of kernel system calls 350 or 450) are potentially used by an application, for example, an application associated with a container image (e.g., container image 460) based on dynamically loaded symbols identified by static analysis of the container image (e.g., an executable file associated with the application). For example, a static analysis module (e.g., static analysis module 420) may be used to parse and analyze appropriate portions of an executable within the container image that contain dynamic linking information. According to one embodiment, this determination may be made by first identifying one or more dynamically loaded symbols corresponding to one or more functions of a first set of functions (e.g., functions 320*a-n* and/or functions 330*a-n*) contained within a shared library (e.g., library 320 or 330) of one or more libraries by performing a static analysis of an executable representing the application. Then, for each function of the one or more functions corresponding to the one or more identified one or more dynamically loaded symbols, a kernel system call upon which the function is reliant may be determined based on usage by the function of a second set of one or more functions (e.g., read( ), write( ), open( ), etc.) contained within a standard library (e.g., library 340) of the one or more libraries and a known mapping between the second set of one or more functions and respective kernel system calls (e.g., sys_read( ), sys_write( ), sys_open( ), etc. of kernel system calls 350).

At block 620, a security policy (e.g., security policy 441) may be created to deny those kernel system calls that are not used by the application as indicated by the static analysis performed in block 610. For example, for each of the dynamically loaded symbols identified by the static analysis, a kernel system call identifier (e.g., kernel system call identifier 430) may determine the corresponding shared library function and identify one or more kernel system calls that will result based on an internal mapping data structure that maps functions of one or more standard libraries to corresponding kernel system calls 450.

At block 630, a kernel security module (e.g., kernel security module 442) is caused to enforce the security policy, thereby permitting kernel system calls made by the application during runtime that are deemed necessary for its proper functioning while denying other kernel system calls made by the application deemed unnecessary for its proper functioning. In this manner, the attack surface may be reduced by minimizing the exposed kernel surface.

Figure 7:
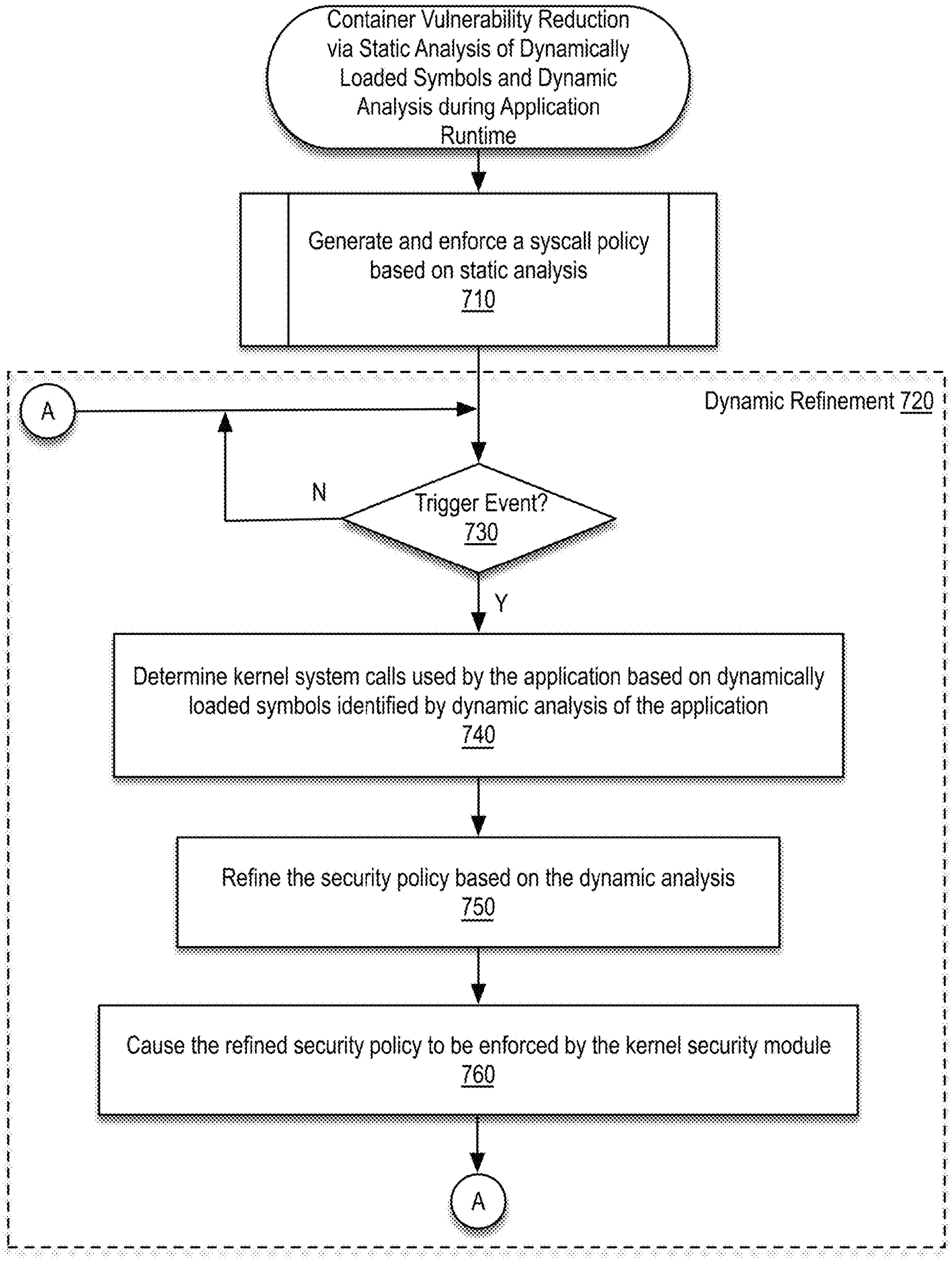
FIG. 7 is a flow diagram illustrating a set of operations for performing container vulnerability reduction via static analysis of dynamically loaded symbols and dynamic analysis during application runtime in accordance with another embodiment of the present disclosure.

Example Container Image Vulnerability Reduction via Static Symbol Analysis of an Executable Combined with Dynamic Analysis FIG. 7 is a flow diagram illustrating a set of operations for performing container vulnerability reduction via static analysis of dynamically loaded symbols and dynamic analysis during application runtime in accordance with another embodiment of the present disclosure. Depending on the particular implementation, the process described with reference to FIG. 7 may be performed by system 400 or other systems.

At block 710, a syscall policy (e.g., security policy 441) may be generated and enforced based on static analysis. According to one embodiment, the generation and enforcement of the syscall policy may be performed in accordance with FIG. 6.

At block 720, a dynamic refinement of the static analysis may be performed.

In one embodiment, the dynamic refinement 720 may include blocks 730 to 760.

At decision block 730, it is determined whether a trigger event has occurred. If so, processing continues with block 740; otherwise, processing loops back to decision block 730. Non-limiting examples of trigger events include execution of a different workload, a different type of workload, or expiration of a predetermined or configurable period of time.

At block 740, dynamic analysis is performed to identify kernel system calls used by the application during runtime. For example, an application or container monitor (e.g., dynamic analysis module 425) may observe the actual use of one or more dynamic loaded symbols by the application or the actual use of one or more library functions over a period of time.

At block 750, the security policy previously applied to the kernel security module in block 710 may be refined based on the dynamic analysis of the application to further reduce the scope of kernel system calls executable by the application. As will be appreciated by those skilled in the art, some kernel system calls that appeared to be utilized by the application based on the static analysis may never actually be performed by the application during runtime as there may be no code path that results in the performance of such kernel system calls via the shared library functions employed by the application.

At block 760, the kernel security module is caused to enforce the refined security policy. Following block 760, processing may loop back to decision block 730 for ongoing refinement of the security policy.

Figure 8:
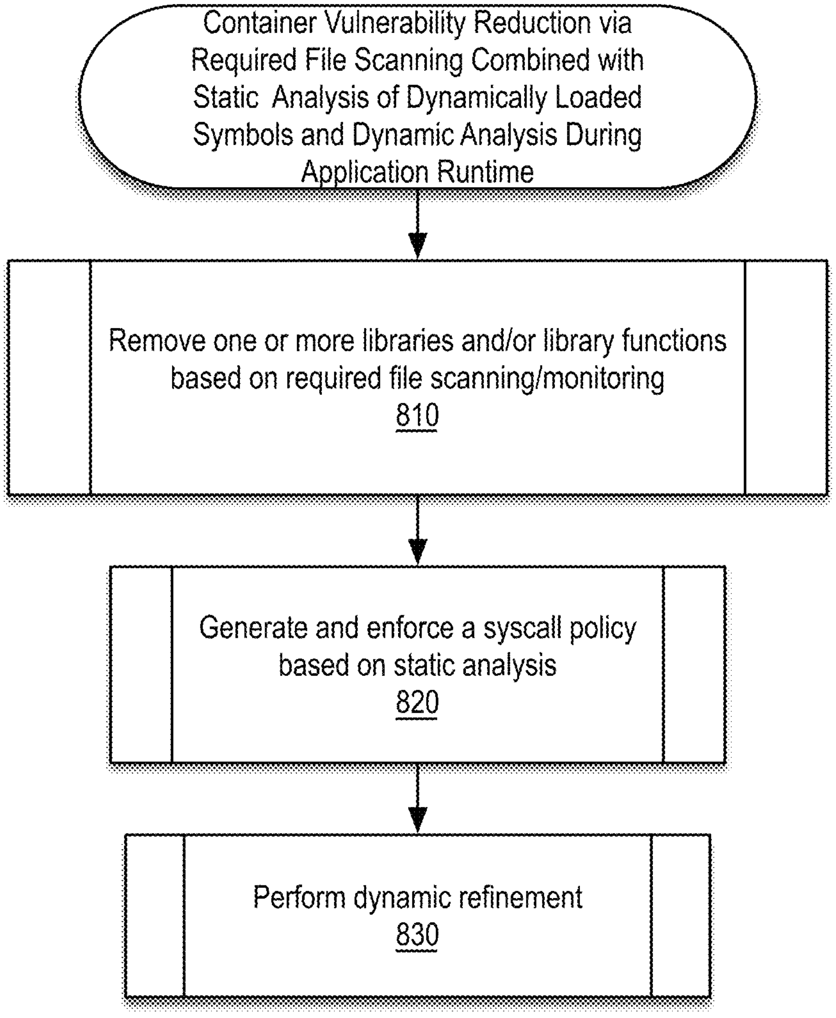
FIG. 8 is a flow diagram illustrating a set of operations for performing container vulnerability reduction via required file scanning combined with static analysis of dynamically loaded symbols and dynamic analysis during application runtime in accordance with yet another embodiment of the present disclosure.

Example Container Image Vulnerability Reduction via Required File Scanning/Monitoring Combined with Static Analysis and/or Dynamic Refinement FIG. 8 is a flow diagram illustrating a set of operations for performing container vulnerability reduction via required file scanning combined with static analysis of dynamically loaded symbols and dynamic analysis during application runtime in accordance with yet another embodiment of the present disclosure. Depending on the particular implementation, the process described with reference to FIG. 8 may be performed by a combination of systems 400 and 900 of FIG. 9 or other systems.

At block 810, required file scanning/monitoring may be performed to remove one or more libraries and/or library functions from a container image (e.g., container image 460). According to one embodiment, block 810 may be performed in accordance with FIG. 10.

At block 820, a syscall policy (e.g., security policy 441) may be generated and enforced based on static analysis. According to one embodiment, the generation and enforcement of the syscall policy may be performed in accordance with FIG. 6.

At block 830, dynamic refinement (e.g., dynamic refinement 720 of FIG. 7) may be performed to refine the security policy based on dynamic analysis of the application during runtime.

Example System for Performing Container Image Vulnerability Reduction

Figure 9:
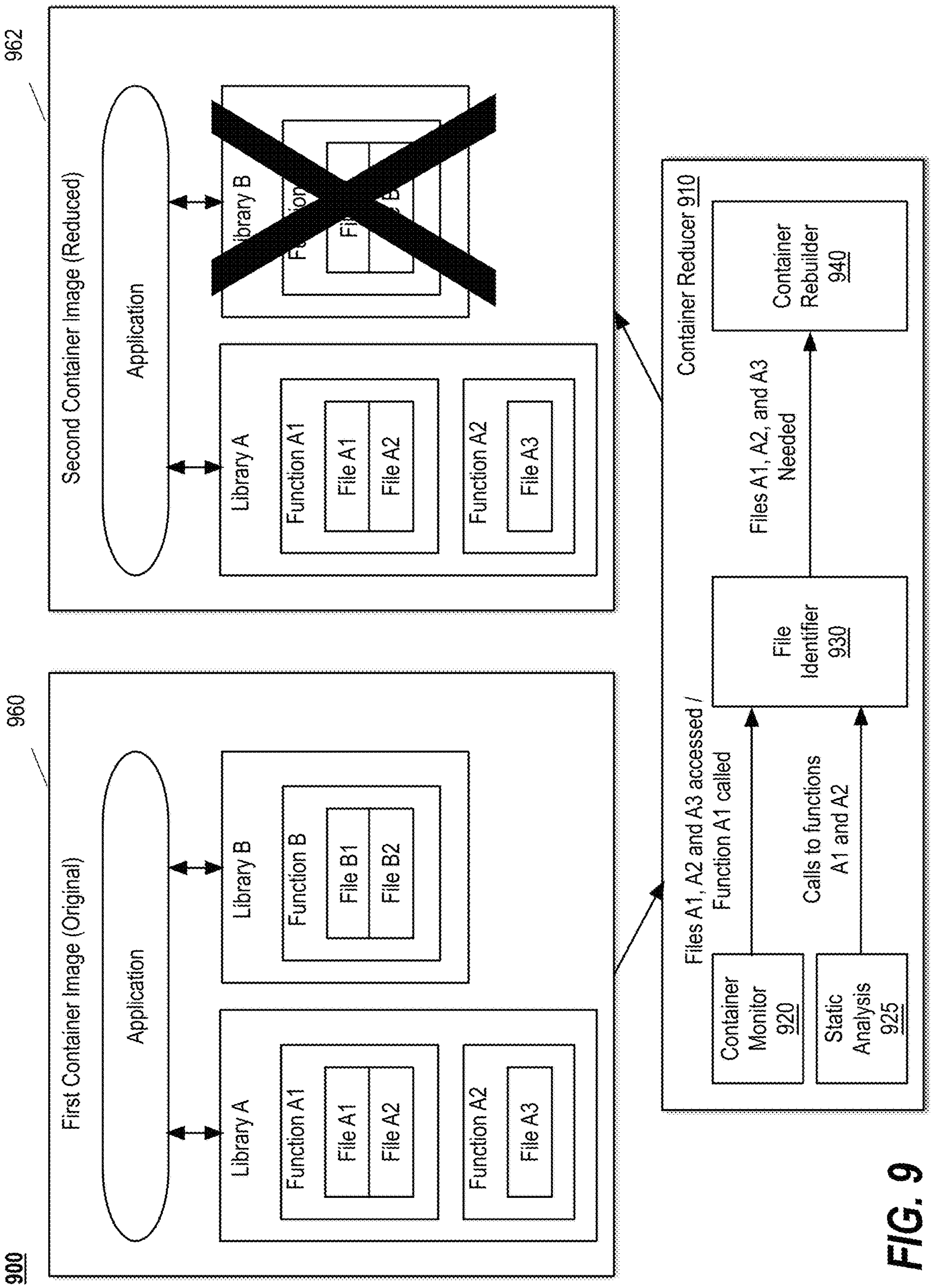
FIG. 9 is a block diagram conceptually illustrating a system for container image vulnerability reduction according to some embodiments of the present disclosure.

FIG. 9 is a block diagram conceptually illustrating a system 900 for container image vulnerability reduction according to some embodiments of the present disclosure. In the context of the present example, the system 900 includes a container reducer 910 that reduces vulnerabilities in container images. For example, the container reducer 910 may receive a first container image 960 and then generate a second container image 962 that excludes some files, libraries, and/or functions that expose vulnerabilities. In one embodiment, the container reducer 910 may be implemented by a security service (e.g., security service 125) of a container orchestration platform (e.g., container orchestration platform 110).

As shown in FIG. 9, the container reducer 910 receives a first container image 960. The first container image 960 may be configured to instantiate a container in which a particular application can be executed. To enable execution of the particular application, the first container image 960 may include one or more libraries. For example, the first container image may include Library A and Library B. A library may be a collection of files that provide functions that may be called upon by an application executed in a container. For example, Library A includes File A1 and File A2, that together are used to provide Function A1, and File A3, that provides Function A2, and Library B includes File B1 and File B2 that together provide Function B.

The container reducer 910 may determine files in the first container image 960 that are unnecessary for executing the application and reduce vulnerabilities in the first container image 960 by generating the second container image 962 that excludes those files. For example, the container reducer 910 may generate the second container image 962 that excludes File B1 and File B2, so the second container image 962 does not provide Function B for the application and does not include Library B, but also does not include vulnerabilities exposed by File B1 and B2 and Library B. Accordingly, the second container image 962 may have reduced vulnerabilities and size compared to the first container image 960, while still being able to execute the application.

The container reducer 910 may include a container monitor 920, a static analysis module 925, a file identifier 930, and a container rebuilder 940 that are used to determine files in the first container image 960 that are unnecessary for executing the application and generate the second container image 162 based on the determination.

The container monitor 920 may perform dynamic analysis of the application including monitoring events that occur during execution of the application in a container instantiated from the first container image 960. The monitoring performed by the container monitor 920 may be accomplished by a variety of approaches, including, but not limited to, library interposition, system call table hooking, and/or the use of a syscall wrapper. In the context of the present example, the container monitor 920 may determine that during execution of various functional tests, Files A1, A2, and A3 were accessed and Function A1 was called. The container monitor 920 may monitor events by obtaining file system access events. For example, each time a file is accessed, the container monitor 920 may receive a file system access event from a kernel of an OS that hosts the container, where the file system access event indicates the file that was accessed. In another example, each time a function is called by an application, the container monitor 920 may receive an indication of the function that was called.

The container monitor 920 may provide an indication to the file identifier 930 of the events that occurred during the limited execution of the application in the container. For example, the container monitor 920 may log that during the functional testing only Files A1, A2, and A3 were accessed and Function A1 was called, and provide the names of those files and functions to the file identifier 930. In another example, the container monitor 920 may not log any accesses of Files B1 and B2 or calls for Function B during the limited execution and, in response, not provide the names of those files and functions to the file identifier 930. Since the dynamic analysis of the application performed by container monitor 920 may not exercise all code paths and the application may fail should a dependency be missing from the container image, the static analysis module 925 may further supplement the file identifier 930 to include calls to functions found within a full scan of the executable of the application, thereby ensuring dependencies not observed during the limited dynamic analysis are retained when the executable to be included within the second container image 962 is generated.

The file identifier 930 may identify files that are necessary for executing the application based on the events detected by the container monitor 920 and calls contained within the executable of the application detected by the static analysis module 925. As noted above, in some implementations, once an application calls a function of a library (e.g., as part of functional testing), all of the files of the library may be accessed and loaded into memory even if the function does not use all the files in the library. For example, when Function A1 of Library A is called, a kernel of the OS may access the contents of Files A1 and A2 that provide Function A1 and also access the contents of File A3 that provides Function A2, even if Function A2 is never called. As such, in the context of the present example, because a call to function A2 was not observed by the container monitor 920 during dynamic analysis of the application, there is insufficient information to determine whether File A3 is necessary for execution of the application. Based solely on the observations of the container monitor 920 (i.e., that Files A1, A2, and A3 were accessed and Function A1 was called), the file identifier 930 may properly conclude that at least Files A1 and A2 are necessary for execution of the application, but should not conclude that File A3 is not necessary for execution of the application.

Scanning of the executable representing an application by static analysis module 925 may fill in the blind spots inherent in performing limited dynamic analysis. For example, the static analysis module 925 may parse the entirety of an executable file of the application and inform the file identifier of calls made to external library functions (in this case, calls to functions A1 and A2). In this example, the static analysis module 925 has confirmed function A2 is necessary for execution of the application, thereby supplementing and extending the findings of the container monitor 920.

The file identifier 930 may provide an indication of the files that the file identifier 930 identified as necessary to execution the application based on observations by both the container monitor 920 and the static analysis module 925 to the container rebuilder 940. For example, the file identifier 930 may identify that only Files A1, A2, A3 are necessary out of all the files in the first container image 960 and, in response, provides the names of Files A1, A2, and A3 to the container rebuilder 940 without the names of Files B1 and B2.

The container rebuilder 940 may generate the second container image 962 based on the files indicated by the file identifier 930 as necessary for execution of the application. For example, the container rebuilder 940 may receive an indication from the file identifier 930 that Files A1, A2, and A3 are needed and, in response, generate the second container image 962 that includes Files A1, A2, and A3 but doesn't include Files B1 and B2. In this manner, a more conservative approach is provided for container vulnerability reduction that does not rely solely on dynamic analysis, thereby obtaining the benefits of excluding files of libraries and/or entire libraries that are deemed unnecessary for proper execution of an application while also ensuring the inherent limitations of dynamic analysis do not result in breaking the application.

While in the context of the present example, all files of a particular library (i.e., Library B) were excluded from the second container image 962, it is to be appreciated the granularity of exclusion may be at the file level. For example, in the above example, if the static analysis module 925 did not find a call to function A2, File A3 would also have been excluded from the second container image 962.

Figure 10:
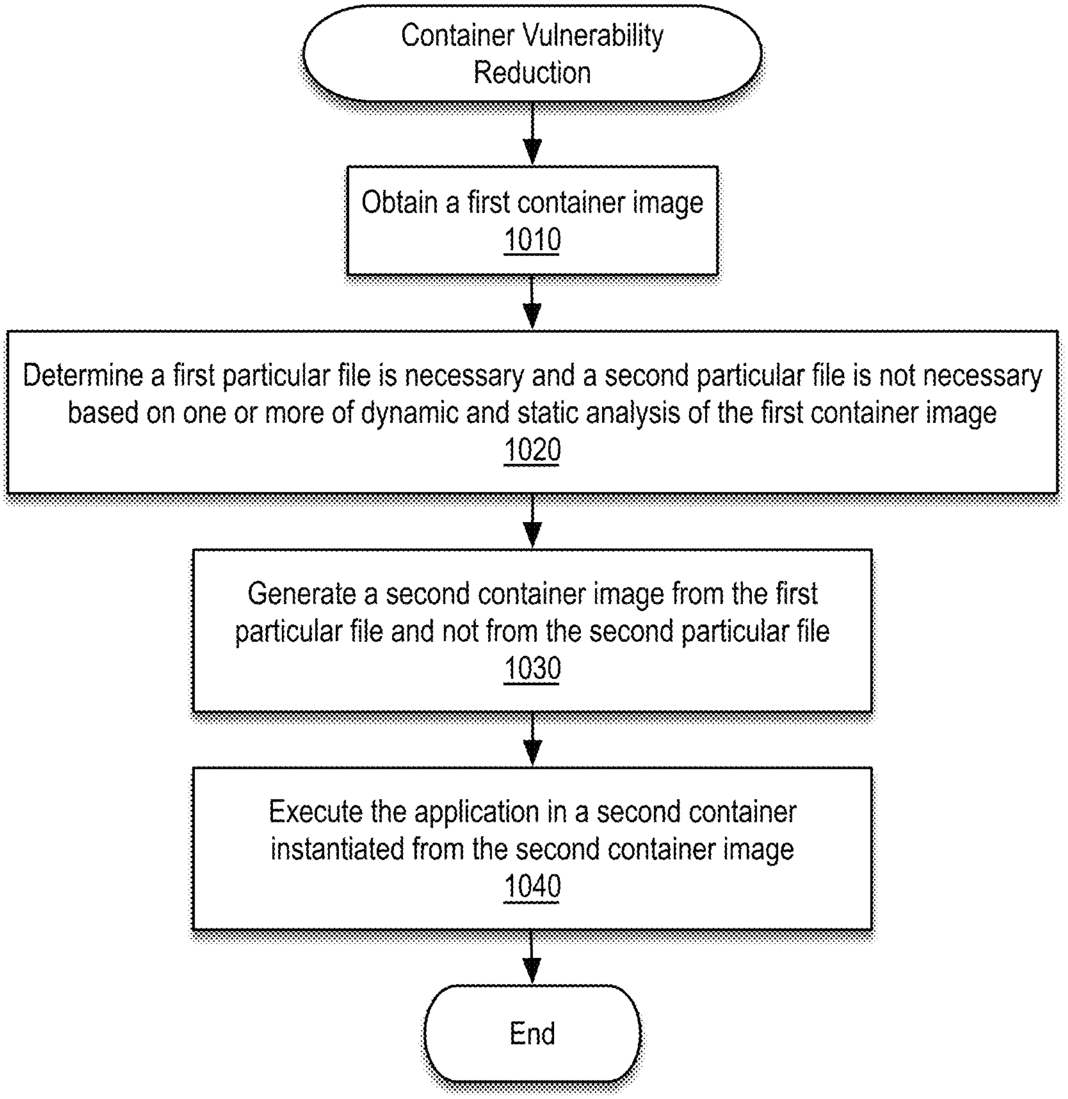
FIG. 10 is a flow diagram illustrating a set of operations for performing container image vulnerability reduction in accordance with an embodiment of the present disclosure.

Example Container Image Vulnerability Reduction via File, Library, and/or Function Removal FIG. 10 is a flow diagram illustrating a set of operations for performing container image vulnerability reduction in accordance with an embodiment of the present disclosure. Depending on the particular implementation, the process described with reference to FIG. 10 may be performed by system 900 or other systems.

At block 1010, a first container image is obtained. For example, a container monitor (e.g., container monitor 920) may obtain a first container image that is formed from Files A1, A2, A3, B1, and B3.

At block 1020, it may be determined that a first particular file of the set of files is necessary for an application and a second particular file of the set of files is not necessary for the application based on one or both of dynamic analysis (e.g., execution of the application in a first container instantiated based on the first container image) and static analysis. According to one embodiment, a file identifier (e.g., file identifier 930) may receive an indication from the container monitor that during functional testing of the application within a container instantiated from the first container image, Files A1, A2, A3 were accessed and Function A1 was called; and, in response, determine that at least Files A1 and A2 are necessary to execute the application. For example, the functional testing of the application may be performed in a build environment (e.g., build environment 120) prior to deploying the application within a production environment (e.g., production environment 130). Alternatively or additionally, the file identifier may receive an indication from a static analysis module (e.g., static analysis module 925) that calls to both Functions A1 and A2 are contained in the executable of the application. In one embodiment, combining the results of the dynamic and static analysis results in a determination that Files A1, A2, and A3 are necessary to execute the application in a container instantiated from the first container image and Files B1 and B2 are not necessary to execute the application in a container instantiated from the first container image.

In some implementations, determining that a first particular file of the set of files is necessary for an application and a second particular file of the set of files is not necessary for the application based on execution of the application in the first container instantiated with the first container image includes obtaining, from a kernel of an operating system that hosts the first container, an indication that a file system event of accessing was performed with the first particular file. For example, each time a file is accessed, the container monitor may receive a notification from the kernel of the operating system with the name of the file and the file identifier may determine those files accessed are necessary to execute the application. These file accesses during dynamic analysis may also be supplemented with file accesses identified based on static analysis of the application executable and those files not notified as being accessed and not identified based on the static analysis may be deemed not necessary to execute the application.

In some implementations, determining that a first particular file of the set of files is necessary for an application and a second particular file of the set of files is not necessary for the application based on execution of the application in the first container instantiated with the first container image includes determining that a function that uses the first particular file was called. For example, each time a function is called, the container monitor may receive a notification with the name of the function and the file identifier may identify the files that correspond to the named functions and determine those identified files are necessary. These function calls observed during dynamic analysis may also be supplemented with function calls identified based on static analysis of the application executable and those function calls not notified as being called and not identified based on the static analysis of the application executable may be deemed not necessary to execute the application.

In some implementations, the file identifier may determine a file is necessary if the file was accessed, if a function provided by the file was called, if an access to the file is contained in the application executable, or if a call to the function is contained in the application executable, or some combination thereof. In some other implementations, the file identifier may determine a file is necessary during the dynamic analysis stage only if both the file was accessed and if a function provided by the file was called.

At block 1030, after determining that the first particular file of the set of files is necessary for an application and the second particular file of the set of files is not necessary for the application based on one or both of dynamic and static analysis performed in block 1020, a second container image may be generated from the first particular file and not from the second particular file. For example, a container rebuilder (e.g., container rebuilder 940) may generate the second container image that includes Files A1, A2, and A3 but does not include Files B1 and B2.

In some implementations, generating a second container image from the first particular file and not from the second particular file includes copying the first particular file into a new folder with a subfolder that matches a subfolder of the first particular file in the first container image and generating the second container image based on the subfolder structure of files within the new folder. For example, the container rebuilder may create a new folder named "reduced," determine that the path of File A1 in the first container image is "\library A\," in response, create a subfolder named "library A" in the folder named "reduced," put a copy of File A1 in the subfolder "library A," do the same for all other files indicated as necessary, and then generate a container image from all the contents in the new folder.

In some implementations, generating a second container image from the first particular file and not from the second particular file includes updating symbolic links in files within the new folder to use the new folder. For example, the container rebuilder may determine that the new folder includes a file with a reference to the folder named "original" and, in response, change the reference to the folder "reduced."

In some implementations, when a file is copied from the first container image to the "reduced" directory, the file's permission, owner, and group may be updated to match the context in the first container image. By default, when a file is copied to a temporary "reduced" directory, the file's owner, group, and permission may be changed to the user and group on the host where the file is copied to. Generally, the owner and group of the file in the first container do not exist on the host where the "reduced" directory is created, so the container rebuilder may "hard-code" the appropriate owner, group, permission into files in the new directory. Additionally or alternatively, in some implementations the file that the file identifier identifies may not exist in the first container image because it is a short-lived temporary file that was created and removed within a very short time. The container rebuilder may need to skip such files or directories. Accordingly, the container rebuilder may determine whether each file identified by the file identifier is a temporary file and, if not, copy the file to the new directory. In some implementations, the container rebuilder may determine whether the file is a temporary file based on a file name.

At block 1040, the application is executed in a second container instantiated with the second container image. For example, the container rebuilder may provide the second container image to be deployed to the production environment to instantiate a container that has less vulnerabilities than a container built based on the first container image.

While in the context of the flow diagrams of FIGS. 5-8 and 10, a number of enumerated blocks are included, it is to be understood that other examples may include additional blocks before, after, and/or in between the enumerated blocks. Similarly, in some examples, one or more of the enumerated blocks may be omitted and/or performed in a different order.

While various examples may be described with reference to container vulnerability reduction, the methodologies described herein are applicable to application vulnerability reduction in general regardless of the architecture type (e.g., monolithic, microservices-based, etc.) and/or the target execution environment (on-prem, cloud, embedded, high-assurance, etc.) of the application. For example, application vulnerability reduction may be performed for an executable (e.g., an EXE file or an ELF file) of an application (e.g., an application or program designed for execution on a Windows computer or a Linux computer) that is not associated with a container image by performing one or more of the vulnerability reduction approaches described.

As yet another alternative, in one embodiment, the methodologies described herein may be used to generate specific shared libraries for specific workloads. For example, both an enterprise system (needing more access and flexibility) and an industrial control system (that should be more limited) may access a database. In such a case, a more lenient shared library with more function calls retained may be generated for the enterprise system to allow more access and suitable flexibility, whereas a stricter shared library with fewer function calls retained may be generated for the industrial control system.

Example Computer System

Embodiments of the present disclosure include various steps, which have been described above. The steps may be performed by hardware components or may be embodied in machine-executable instructions, which may be used to cause one or more processing resources (e.g., one or more general-purpose and/or special-purpose processors) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 11:
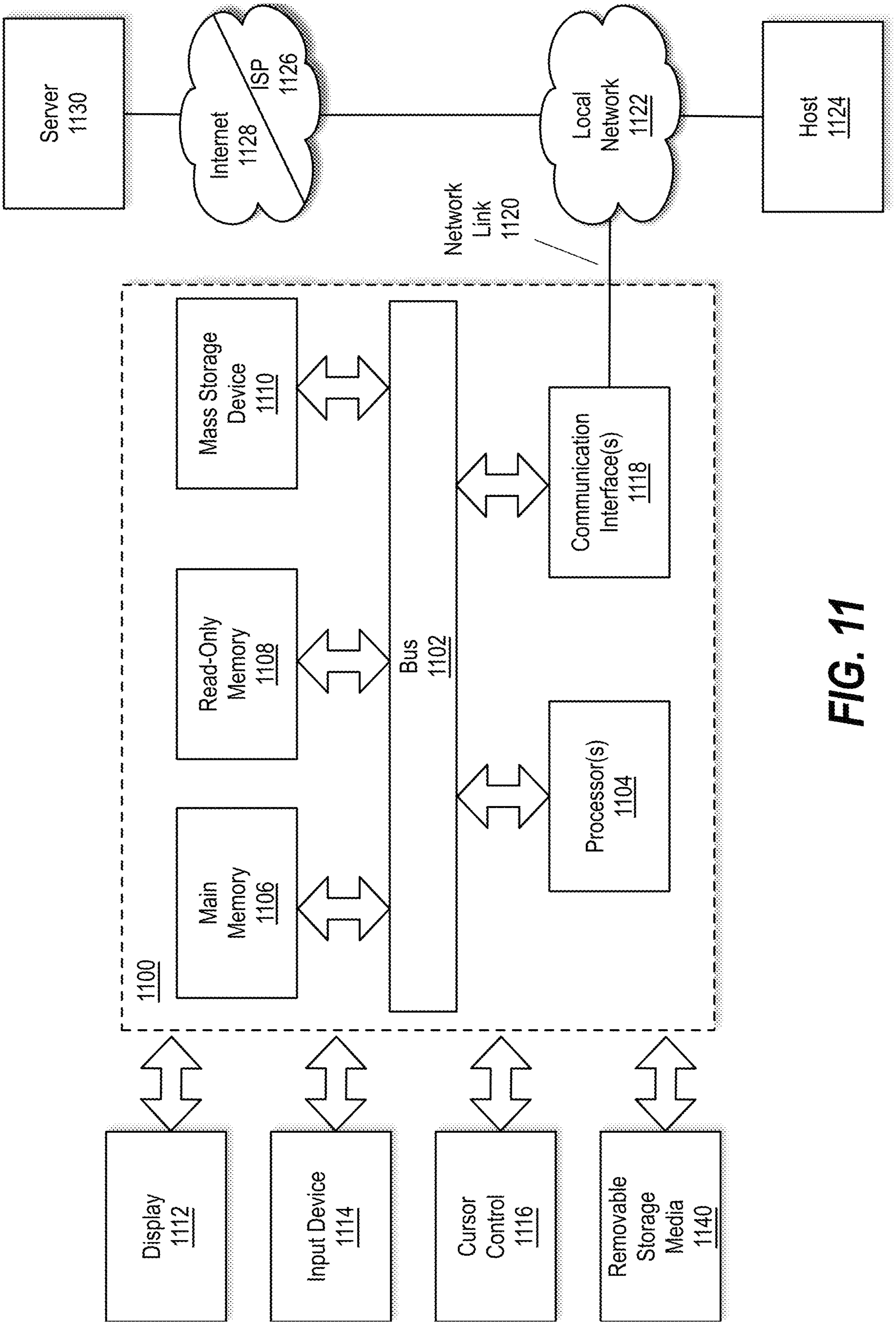
FIG. 11 illustrates an example computer system in which or with which embodiments of the present disclosure may be utilized.

FIG. 11 is a block diagram that illustrates a computer system 1100 in which or with which an embodiment of the present disclosure may be implemented. Computer system 1100 may serve as an example of all or a portion of the computing resources of a physical machine representing one or more nodes of a build environment (e.g., build environment 120) and/or one or more nodes of a target computing environment, for example, a production environment (e.g., production environment 130). Notably, components of computer system 1100 described herein are meant only to exemplify various possibilities. In no way should example computer system 1100 limit the scope of the present disclosure. In the context of the present example, computer system 1100 includes a bus 1102 or other communication mechanism for communicating information, and one or more processing resources (e.g., one or more hardware processor(s) 1104) coupled with bus 1102 for processing information. Hardware processor(s) 1104 may be, for example, one or more general purpose microprocessors.

Computer system 1100 also includes a main memory 1106, such as a random access memory (RAM) or other dynamic storage device, coupled to bus 1102 for storing information and instructions to be executed by processor(s) 1104. Main memory 1106 also may be used for storing temporary variables or other intermediate information during execution of instructions to be executed by processor(s) 1104. Such instructions, when stored in non-transitory storage media accessible to processor(s) 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor(s) 1104. A storage device 1110, e.g., a magnetic disk, optical disk or flash disk (made of flash memory chips), is provided and coupled to bus 1102 for storing information and instructions.

Computer system 1100 may be coupled via bus 1102 to a display 1112, e.g., a cathode ray tube (CRT), Liquid Crystal Display (LCD), Organic Light-Emitting Diode Display (OLED), Digital Light Processing Display (DLP) or the like, for displaying information to a computer user. An input device 1114, including alphanumeric and other keys, is coupled to bus 1102 for communicating information and command selections to processor(s) 1104. Another type of user input device is cursor control 1116, such as a mouse, a trackball, a trackpad, or cursor direction keys for communicating direction information and command selections to processor(s) 1104 and for controlling cursor movement on display 1112. This input device typically has two degrees of freedom in two axes, a first axis (e.g., x) and a second axis (e.g., y), that allows the device to specify positions in a plane.

Removable storage media 1140 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1100 may implement the techniques described herein using customized hard-wired logic, one or more ASICs or FPGAs, firmware or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1110. Volatile media includes dynamic memory, such as main memory 1106. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor(s) 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor(s) 1104 retrieve and execute the instructions. The instructions received by main memory 1106 may optionally be stored on storage device 1110 either before or after execution by processor(s) 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. The received code may be executed by processor(s) 1104 as it is received, or stored in storage device 1110, or other non-volatile storage for later execution.

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments require more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for operating a proof of creation facilitator service according to embodiments and examples described herein.

Some embodiments pertain to Example 1 that includes a method comprising: receiving an executable of an application and dependencies of the application, including one or more libraries; prior to execution of the application, identifying a first set of kernel system calls that might be used by the application by performing a static analysis of an executable representing the application; creating or updating a security policy based on the first set of kernel system calls; and causing a kernel security module to block those kernel system calls that are not in the first set of kernel system calls during execution of the application by configuring the kernel security module based on the security policy.

Example 2 includes the subject matter of Example 1, further comprising: during execution of the application, determining a second set of kernel system calls that are actually used by the application; refining the security policy based on the second set of kernel system calls; and causing the kernel security module to block those kernel system calls that are not in the second set of kernel system calls during execution of the application by configuring the kernel security module based on the refined security policy.

Example 3 includes the subject matter of Example 1 or 2, wherein the static analysis discovers one or more dynamically loaded symbols corresponding to one or more functions of a shared library of the one or more libraries that ultimately lead to respective kernel system calls of the first set of kernel system calls.

Example 4 includes the subject matter of Example 3, wherein the one or more dynamically loaded symbols are discovered by parsing and analyzing one or more portions of the executable that contain dynamic linking information.

Example 5 includes the subject matter of Example 3, wherein said determining involves observing actual use of one or more dynamically loaded symbols corresponding to one or more functions of a shared library of the one or more libraries that ultimately lead to respective kernel system calls of the second set of kernel system calls.

Example 6 includes the subject matter of Example 5, wherein a decision regarding which of the one or more functions ultimately lead to respective kernel system calls of the second set of kernel system calls is arrived at by for each function of the one or more functions by determining a kernel system call of the second set of kernel system calls upon which the function is reliant based on usage by the function of a second set of one or more functions contained within a standard library of the one or more libraries and a known mapping between the second set of one or more functions and the respective kernel system calls.

Example 7 includes the subject matter of any of Examples 1-6, wherein the kernel security module comprises Security-Enhanced Linux or Application Armor.

Example 8 includes the subject matter of any of Examples 1-7, wherein the shared library comprises a shared object file or a dynamic library.

Some embodiments pertain to Example 9 that includes a non-transitory machine readable medium storing instructions, which when executed by one or more processing resources of a system, cause the system to: receive a first application package containing an executable of an application and dependencies of the application, including one or more libraries; prior to execution of the application in a target computing environment, identify a first set of libraries or functions of the one or more libraries that are not used by the application by performing one or more of: static analysis of an executable representing the application; and dynamic monitoring of the application as the application is run in a build environment; generate a second application package for the application that excludes the identified first set of libraries or functions; execute the application within the target computing environment based on the second application package; and cause a kernel security module to block one or more kernel system calls during execution of the application in the target computing environment based on identification of one or more dynamically loaded symbols corresponding to one or more functions of the one or more libraries.

Example 10 includes the subject matter of Example 11, wherein at least a first kernel system call of the one or more kernel system calls represents a kernel system call that might or might not be used by the application, wherein the instructions further cause the system to identify a first subset of the one or more dynamically loaded symbols during the static analysis, and wherein the first subset of the one or more dynamically loaded symbols correspond to one or more functions of a first set of functions contained within a first shared library of the one or more libraries.

Example 11 includes the subject matter of Example 10, wherein the one or more functions ultimately lead to respective kernel system calls of the one or more kernel system calls.

Example 12 includes the subject matter of Example 10, wherein the one or more dynamically loaded symbols are identified by parsing and analyzing one or more portions of the executable that contain dynamic linking information.

Example 13 includes the subject matter of Example 10, wherein the instructions further cause the system to: create or update a syscall policy based at least on the first kernel system call; and wherein said causing a kernel security module to block one or more kernel system calls comprises configuring the kernel security module based on the syscall policy.

Example 14 includes the subject matter of Example 13, wherein at least a second kernel system call of the one or more kernel system calls represents a kernel system call that is actually used by the application, wherein the instructions further cause the system to identify a second subset of the one or more dynamically loaded symbols during a dynamic analysis, and wherein the second subset of the one or more dynamically loaded symbols correspond to one or more functions of a second set of functions contained within the first shared library or a second shared library of the one or more libraries.

Example 15 includes the subject matter of Example 14, wherein the instructions further cause the system to: refine the syscall policy based at least one the second kernel system call; and wherein the kernel security module is caused to block one or more kernel system calls by configuring the kernel security module based on the refined syscall policy.

Example 16 includes the subject matter of any of Examples 9-15, wherein the first shared library and the second shared library comprise one or more of a shared object file and a dynamic library.

Some embodiments pertain to Example 17 that includes a system comprising: one or more processing resources; and instructions that when executed by the one or more processing resources cause the system to: receive an executable of an application and dependencies of the application, including one or more libraries; prior to execution of the application, identify a first set of kernel system calls that might be used by the application by performing a static analysis of an executable representing the application; create or update a syscall policy based on the first set of kernel system calls; and cause a kernel security module to block those kernel system calls that are not in the first set of kernel system calls during execution of the application by configuring the kernel security module based on the syscall policy.

Example 18 includes the subject matter of Example 17, wherein the instructions further cause the system to: during execution of the application, determine a second set of kernel system calls that are actually used by the application; refine the syscall policy based on the second set of kernel system calls; and cause the kernel security module to block those kernel system calls that are not in the second set of kernel system calls during execution of the application by configuring the kernel security module based on the refined syscall policy.

Example 19 includes the subject matter of Example 17, wherein the static analysis discovers one or more dynamically loaded symbols corresponding to one or more functions of a shared library of the one or more libraries that ultimately lead to respective kernel system calls of the first set of kernel system calls.

Example 20 includes the subject matter of Example 19, wherein the one or more dynamically loaded symbols are discovered by parsing and analyzing one or more portions of the executable that contain dynamic linking information.

Example 21 includes the subject matter of Example 19, wherein determination of the second set of kernel system calls involves observing actual use of one or more dynamically loaded symbols corresponding to one or more functions of a shared library of the one or more libraries that ultimately lead to respective kernel system calls of the second set of kernel system calls.

Example 22 includes the subject matter of Example 21, wherein a decision regarding which of the one or more functions ultimately lead to respective kernel system calls of the second set of kernel system calls is arrived at by for each function of the one or more functions by determining a kernel system call of the second set of kernel system calls upon which the function is reliant based on usage by the function of a second set of one or more functions contained within a standard library of the one or more libraries and a known mapping between the second set of one or more functions and the respective kernel system calls.

Example 23 includes the subject matter of any of Examples 17-22, wherein the kernel security module comprises Security-Enhanced Linux or Application Armor.

Example 24 includes the subject matter of any of Examples 17-23, wherein the shared library comprises a shared object file or a dynamic library.

Some embodiments pertain to Example 25 that includes an apparatus or a system that implements or performs a method of any of Examples 1-8.

Example 26 includes at least one machine-readable medium comprising a plurality of instructions, when executed on a computing device, implement or perform a method or realize an apparatus as described in any preceding Example.

Example 27 includes an apparatus comprising means for performing a method as claimed in any of Examples 1-8.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of reducing one or more security vulnerabilities to which an application is exposed, the method comprising:

receiving an executable of the application and dependencies of the application, including one or more libraries;

prior to execution of the application, identifying a first set of kernel system calls by performing a static analysis of an executable representing the application, wherein the static analysis:

(a) parses one or more sections of the executable to discover one or more dynamically loaded symbols corresponding to one or more functions of a first set of functions contained within a shared library of the one or more libraries in which the one or more functions depend on respective kernel system calls of the first set of kernel system calls; and (b) for each function of the one or more functions corresponding to the one or more dynamically loaded symbols, determines a respective kernel system call of the first set of kernel system calls upon which the function is reliant based on:

(i) usage by the function of a second set of one or more functions contained within a standard library of the one or more libraries; and (ii) a known mapping between the second set of one or more functions of the standard library and respective kernel system calls of a plurality of kernel system calls;

creating or updating a security policy based on the first set of kernel system calls; and causing a kernel security module to block those kernel system calls of the plurality of kernel system calls that are not in the first set of kernel system calls during execution of the application by configuring the kernel security module based on the security policy.

2. The method of claim 1, further comprising:

during execution of the application, determining a second set of kernel system calls that are actually used by the application by observing actual use of one or more of the dynamically loaded symbols corresponding to the one or more functions of the shared library;

refining the security policy based on the second set of kernel system calls; and causing the kernel security module to block those kernel system calls that are not in the second set of kernel system calls during execution of the application by configuring the kernel security module based on the refined security policy.

3. The method of claim 2, wherein said determining the second set of kernel system calls involves observing actual use of one or more dynamically loaded symbols corresponding to one or more functions of the shared library that ultimately lead to respective kernel system calls of the second set of kernel system calls based on usage by the one or more functions of the second set of one or more functions contained within the standard library and the known mapping.

4. The method of claim 3, wherein a decision regarding which of the one or more functions ultimately lead to respective kernel system calls of the second set of kernel system calls is arrived at by for each function of the one or more functions by determining a kernel system call of the second set of kernel system calls upon which the function is reliant based on usage by the function of the second set of one or more functions contained within the standard library of the one or more libraries and the known mapping between the second set of one or more functions and the respective kernel system calls, wherein the known mapping associates each function of the second set of one or more functions of the standard library with a corresponding kernel system call without requiring construction of a call graph through the standard library.

5. The method of claim 1, wherein the one or more sections of the executable that are parsed comprise one or more of a symbol table section and a dynamic linking symbol table section of the executable.

6. The method of claim 1, wherein the kernel security module comprises Security-Enhanced Linux or Application Armor.

7. The method of claim 1, wherein the shared library comprises a shared object file or a dynamic library.

8. A non-transitory machine readable medium storing instructions for reducing one or more security vulnerabilities to which an application is exposed, which when executed by one or more processing resources of a system, cause the system to:

receive a first application package containing an executable of the application and dependencies of the application, including one or more libraries;

prior to execution of the application in a target computing environment, identify a first set of libraries or functions of the one or more libraries that are not used by the application by performing static analysis of an executable representing the application and dynamic monitoring of the application as the application is run in a build environment, wherein identification of the first set of libraries or functions includes determining:

(i) whether a particular function provided by a given library of the first set of libraries or functions was called during the dynamic monitoring;

(ii) whether an access to a file of the given library is contained in the executable based on the static analysis; and (iii) whether a call to the particular function of the first set of libraries or functions is contained in the executable based on the static analysis;

wherein a library or function of the first set of libraries or functions is identified as not used by the application when none of:

(a) the particular function was called during the dynamic monitoring, (b) the access to the file of the given library is contained in the executable, and (c) the call to the particular function is contained in the executable, are satisfied;

generate a second application package for the application from files corresponding to libraries or functions not identified as part of the first set of libraries or functions and that excludes the identified first set of libraries or functions;

execute the application within the target computing environment based on the second application package; and cause a kernel security module to block one or more kernel system calls during execution of the application in the target computing environment based on identification of one or more dynamically loaded symbols corresponding to one or more functions of the one or more libraries, wherein the one or more dynamically loaded symbols are identified by parsing one or more sections of the executable that contain dynamic linking information, and wherein the one or more kernel system calls are determined based on usage by the one or more functions of functions contained within a standard library and a known mapping between the functions of the standard library and respective kernel system calls.

9. The non-transitory machine readable medium of claim 8, wherein at least a first kernel system call of the one or more kernel system calls represents a kernel system call that might or might not be used by the application, wherein the instructions further cause the system to identify a first subset of the one or more dynamically loaded symbols during the static analysis, and wherein the first subset of the one or more dynamically loaded symbols correspond to one or more functions of a first set of functions contained within a first shared library of the one or more libraries.

10. The non-transitory machine readable medium of claim 9, wherein the one or more functions ultimately lead to respective kernel system calls of the one or more kernel system calls.

11. The non-transitory machine readable medium of claim 9, wherein the one or more dynamically loaded symbols are identified by parsing and analyzing one or more of a symbol table section and a dynamic linking symbol table section of the executable to identify symbols of a type associated with executable code in shared libraries.

12. The non-transitory machine readable medium of claim 9, wherein the instructions further cause the system to:

create or update a syscall policy based at least on the first kernel system call; and wherein said causing a kernel security module to block one or more kernel system calls comprises configuring the kernel security module based on the syscall policy.

13. The non-transitory machine readable medium of claim 12, wherein at least a second kernel system call of the one or more kernel system calls represents a kernel system call that is actually used by the application, wherein the instructions further cause the system to identify a second subset of the one or more dynamically loaded symbols during a dynamic analysis, and wherein the second subset of the one or more dynamically loaded symbols correspond to one or more functions of a second set of functions contained within the first shared library or a second shared library of the one or more libraries.

14. The non-transitory machine readable medium of claim 13, wherein the instructions further cause the system to:

refine the syscall policy based at least one the second kernel system call; and wherein the kernel security module is caused to block one or more kernel system calls by configuring the kernel security module based on the refined syscall policy.

15. The non-transitory machine readable medium of claim 13, wherein the first shared library and the second shared library comprise one or more of a shared object file and a dynamic library.

16. A system comprising:

one or more hardware processing resources; and instructions for reducing one or more security vulnerabilities to which an application is exposed that when executed by the one or more hardware processing resources cause the system to:

receive an executable of the application and dependencies of the application, including one or more libraries;

prior to execution of the application, identify a first set of kernel system calls by performing a static analysis of an executable representing the application, wherein the static analysis:

(a) parses one or more sections of the executable to discovers one or more dynamically loaded symbols corresponding to one or more functions of a first set of functions contained within a shared library of the one or more libraries, in which the one or more functions depend on respective kernel system calls of the first set of kernel system calls; and (b) for each function of the one or more functions corresponding to the one or more dynamically loaded symbols, determines a respective kernel system call of the first set of kernel system calls upon which the function is reliant based on:

(i) usage by the function of a second set of one or more functions contained within a standard library of the one or more libraries; and (ii) a known mapping between the second set of one or more functions of the standard library and respective kernel system calls of a plurality of kernel system calls;

create or update a syscall policy based on the first set of kernel system calls; and cause a kernel security module to block those kernel system calls of the plurality of kernel system calls that are not in the first set of kernel system calls during execution of the application by configuring the kernel security module based on the syscall policy.

17. The system of claim 16, wherein the instructions further cause the system to:

during execution of the application, determine a second set of kernel system calls that are actually used by the application by observing actual use of one or more of the dynamically loaded symbols corresponding to the one or more functions of the shared library;

refine the syscall policy based on the second set of kernel system calls; and cause the kernel security module to block those kernel system calls that are not in the second set of kernel system calls during execution of the application by configuring the kernel security module based on the refined syscall policy.

18. The system of claim 17, wherein the one or more sections of the executable that are parsed comprise one or more of a symbol table section and a dynamic linking symbol table section of the executable.

19. The system of claim 17, wherein determination of the second set of kernel system calls involves observing actual use of one or more dynamically loaded symbols corresponding to one or more functions of the shared library that ultimately lead to respective kernel system calls of the second set of kernel system calls based on usage by the one or more functions of the second set of one or more functions contained within the standard library and the known mapping.

20. The system of claim 19, wherein a decision regarding which of the one or more functions ultimately lead to respective kernel system calls of the second set of kernel system calls is arrived at by for each function of the one or more functions by determining a kernel system call of the second set of kernel system calls upon which the function is reliant based on usage by the function of the second set of one or more functions contained within the standard library of the one or more libraries and the known mapping between the second set of one or more functions and the respective kernel system calls, wherein the known mapping associates each function of the second set of one or more functions of the standard library with a corresponding kernel system call without requiring construction of a call graph through the standard library.

21. The system of claim 16, wherein the kernel security module comprises Security-Enhanced Linux or Application Armor.

22. The system of claim 16, wherein the shared library comprises a shared object file or a dynamic library.

* * * * *